United States Patent
Soldati et al.

(10) Patent No.: US 9,900,877 B2
(45) Date of Patent: Feb. 20, 2018

(54) METHODS AND NODES IN A WIRELESS COMMUNICATION SYSTEM

(71) Applicant: Huawei Technologies Co., Ltd., Shenzhen (CN)

(72) Inventors: Pablo Soldati, Kista (SE); Fredrik Berggren, Kista (SE); Weijun Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 115 days.

(21) Appl. No.: 14/803,992

(22) Filed: Jul. 20, 2015

(65) Prior Publication Data

US 2015/0327227 A1 Nov. 12, 2015

Related U.S. Application Data

(63) Continuation of application No. PCT/EP2013/050924, filed on Jan. 18, 2013.

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0005* (2013.01); *H04L 5/0053* (2013.01); *H04W 72/044* (2013.01)

(58) Field of Classification Search
CPC H04L 5/0051; H04W 72/042; H04W 72/044; H04W 72/0406

(Continued)

(56) References Cited

U.S. PATENT DOCUMENTS

2009/0103562 A1  4/2009 Frederiksen et al.
2010/0014481 A1* 1/2010 Ko ........................ H04L 5/0007
                                                  370/330

(Continued)

FOREIGN PATENT DOCUMENTS

CN  102355732 A  2/2012
CN  102420685 A  4/2012

OTHER PUBLICATIONS

3GPP TS 36.211, "3rd Generation Partnership Project; Technical Specification Group Radio Access Network; Evolved Universal Terrestrial Radio Access (E-UTRA); Physical Channels and Modulation (Release 11)" V11.1.0, Dec. 2012, 3 pages.

(Continued)

*Primary Examiner* — Chi H Pham
*Assistant Examiner* — Alexander O Boakye
(74) *Attorney, Agent, or Firm* — Slater Matsil, LLP

(57) ABSTRACT

Methods and nodes for transmission of downlink control channel signals in a downlink frequency carrier of a wireless communication system, wherein at least two PRB pairs, configurable for the transmission of a downlink control channel have different numbers of time-frequency resource elements available for the transmission of said downlink control channel. The method comprises allocating at least one set S of PRB pairs; arranging time-frequency resource elements from said set S into an aggregation comprising at least one level; determining a set LS of aggregation levels supported for the transmission of a downlink control channel within the allocated set of PRB pairs, based on the number of time-frequency resource elements available for the transmission of a downlink control channel in PRB pairs of the set S; and transmitting the downlink control channel within said set S of PRB pairs.

24 Claims, 6 Drawing Sheets

(58) Field of Classification Search
USPC .................................................. 370/330
See application file for complete search history.

(56) References Cited

U.S. PATENT DOCUMENTS

| | | |
|---|---|---|
| 2012/0320846 A1 | 12/2012 | Papasakellariou et al. |
| 2013/0010724 A1 | 1/2013 | Han et al. |
| 2013/0064216 A1* | 3/2013 | Gao ................... H04L 5/0016 370/330 |
| 2015/0295688 A1 | 10/2015 | Pan et al. |

OTHER PUBLICATIONS

MediaTek Inc., R1-124281, "eREG to RE Mapping for ePDCCH", 3GPP TSG-RAN WG1 #70bis, Agenda Item: 7.5.1, San Diego, USA, Oct. 8-12, 2012, 6 pages.

NEC Group, R1-123250, "eREG and eCCE definitions and mappings for ePDCCH", 3GPP TSG RAN WG1 Meeting #70, Agenda Item: 7.6.1, Qingdao, China, Aug. 13-17, 2012, 7 pages.

MediaTek Inc., R1-123337, "ePDCCH transmission in PRBs where there are PBCH or PSS/SSS", 3GPP TSG-RAN WG1 #70, Agenda Item: 7.6.1, Qingdao, China, Aug. 13-17, 2012, 4 pages.

CMCC, R1-123852, "Discussion on ePDCCH Design for Special Subframes," Agenda Item: 7.6.1, 3GPP TSG-RAN WG1 #70, Qingdao, China, Aug. 13-17, 2012, 5 pages.

LG Electronics, R1-124000, "On the working assumption of the threshold for EPDCCH search space", 3GPP TSG RAN WG1 Meeting #70, Agenda item:7.6.3, Qingdao, China, Aug. 13-17, 2012, 2 pages.

Huawei, HiSilicon, R1-124078, "Search space design for EPDCCH", 3GPP TSG RAN WG1 Meeting #70bis, Agenda Item: 7.5.2, San Diego, USA, Oct. 8-12, 2012, 8 pages.

Huawei, HiSilicon, R1-125157, "Overview of non-standalone NCT design", 3GPP TSG RAN WG1 Meeting #71, Agenda Item:6.3.1, New Orleans, USA, Nov. 12-16, 2012, 5 pages.

Nokia, R1-125290, "Remaining details of eREG / eCCE definitions for ePDCCH", 3GPP TSG RAN WG1 Meeting #71, Agenda item: 6.2.3.1, New Orleans, US, Nov. 12-16, 2012.

"Search Space Design and Aggregation Levels Supported in ePDCCH," Source: MediaTek Inc., Agenda Item: 7.5.2, Document for: Discussion and Decision, 3GPP TSG-RAN WG1 #70bis, R1-124282, San Diego, USA, Oct. 8-12, 2012, 4 pages.

"Blind Decoding Ambiguity Resolution," Source: Intel Corporation, Agenda Item 6.2.3.7, Document for: Discussion and Decision, 3GPP TSG-RAN WG1 #71, R1-124731, New Orleans, USA, Nov. 12-16, 2012, 5 pages.

"Remaining Details of Search Space and Aggregation Levels of EPDCCH," Agenda Item: 6.2.3.2, Source: HTC, Document for: Discussion and Decision, 3GPP TSG RAN WG1 Meeting #71, New Orleans, R1-124959, Nov. 12-16th, 2012, 12 pages.

"Number of Blind Decoding Assignment," Agenda Item: 6.2.3.2, Source: Huawei, HiSilicon, Document for: Discussion and Decision, 3GPP TSG RAN WG1 Meeting #71, New Orleans, R1-125152, Nov. 12-16, 2012, 10 pages.

\* cited by examiner

METHODS AND NODES IN A WIRELESS COMMUNICATION SYSTEM

This application is a continuation of International Application No. PCT/EP2013/050924, filed on Jan. 18, 2013, which is incorporated herein by reference in its entirety.

TECHNICAL FIELD

Implementations described herein relate generally to a radio network node, a method in a radio network node, a receiver, and a method in a receiver. In particular is herein described a mechanism for transmission of downlink control channel signals, from the radio network node to the receiver.

BACKGROUND

A receiver, also known as a User Equipment (UE), mobile station, wireless terminal and/or mobile terminal, is enabled to communicate wirelessly in a wireless communication system, sometimes also referred to as a cellular radio system. The communication may be made, e.g., between two receivers, between a receiver and a wire connected telephone and/or between a receiver and a server via a Radio Access Network (RAN) and possibly one or more core networks.

Wireless communication systems are widely deployed to provide various communication services such as voice, video, packet data, messaging, broadcast, etc. These wireless systems may be multiple-access networks capable of supporting multiple users by sharing the available network resources. Examples of such multiple-access systems may comprise, e.g., Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks, just to mention a few arbitrary examples. It may be noted that the terms "network" and "system" are often used interchangeably within the present context.

The receiver may further be referred to as mobile telephones, cellular telephones, computer tablets or laptops with wireless capability. The receivers in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication system covers a geographical area which is divided into cell areas, with each cell area being served by a radio network node, or base station, e.g., a Radio Base Station (RBS), which in some networks may be referred to as transmitter, "eNB", "eNodeB", "NodeB" or "B node", depending on the technology and terminology used. Sometimes, also the expression cell may be used for denoting the radio network node itself. However, the cell is also, or in normal terminology, the geographical area where radio coverage is provided by the radio network node/base station at a base station site. One radio network node, situated on the base station site, may serve one or several cells. The radio network nodes communicate over the air interface operating on radio frequencies with the receivers within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction, i.e., from the receiver to the radio network node.

The downlink of the 3GPP Long Term Evolution (LTE) cellular communication system is based on Orthogonal Frequency Division Multiplex (OFDM) transmission, which uses time and frequency resource units for transmission. The smallest time-frequency resource unit, called Resource Element (RE), comprises a single complex sinusoid frequency (sub-carrier) in an OFDM symbol. For the purpose of scheduling transmissions to the different receivers, the resource elements are grouped into larger units called Physical Resource Blocks (PRBs).

A Resource Element (RE) may convey a complex-valued modulation symbol on a subcarrier. In this context, the RE may be referred to as time-frequency resources, or time-frequency resource elements. A Resource Block (RB) comprises a set of resource elements or a set of time-frequency resources and is of 0.5 ms duration (e.g., 7 Orthogonal Frequency-Division Multiplexing (OFDM) symbols) and 180 kHz bandwidth (e.g., 12 subcarriers with 15 kHz spacing). The LTE standard refers to a PRB as a resource block where the set of OFDM symbols in the time-domain and the set of subcarriers in the frequency domain are contiguous. The LTE standard further defines Virtual Resource Blocks (VRBs) which can be of either localized or distributed type. For brevity, sometimes only the notion of resource block is used and a skilled reader would be able to determine the proper term. The transmission bandwidth of the system is divided into a set of resource blocks. Typical LTE carrier bandwidths correspond to 6, 15, 25, 50, 75 and 100 resource blocks.

A PRB occupies a half of a subframe, called "slot", comprises six or seven consecutive OFDM symbol intervals in time domain (0.5 millisecond in total), and twelve consecutive sub-carrier frequencies in frequency domain (180 kHz in total). Each PRB is indicated by a unique index $n_{PRB} \in [0, N_{RB}^{DL}-1]$ denoting the position of the sub-band that the PRB occupies within a given bandwidth, where $N_{RB}^{DL}$ is the total number of PRB within the bandwidth. The maximum number of PRBs $N_{RB}^{max,DL}$, associated with the largest LTE bandwidth (20 MHz), is 110. The relation between the PRB number $n_{PRB}$ in the frequency domain and resource elements (k, l) in a slot is $n_{PRB} = \lfloor k/N_{sc}^{RB} \rfloor$.

The LTE Rel-8/10 defines a Physical Downlink Control Channel (PDCCH) as a signal containing information needed to receive and demodulate the information transmitted from the serving cell (i.e., eNodeB in LTE terminology) to a receiver through the Physical Downlink Shared Channel (PDSCH). The PDCCH is transmitted in a control region that can occupy up to four OFDM symbols at the beginning of each subframe, whereas the remaining of the subframe forms the data region used for the transmission of the PDSCH channel.

Each transmission of user data on the Physical Downlink Shared Channel (PDSCH) is performed over 1 ms duration, which is also referred to as a subframe, on one or several resource blocks. A radio frame consists of 10 subframes, or alternatively 20 slots of 0.5 ms length (enumerated from 0 to 19).

OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier.

The LTE Rel-11 supports a new control channel scheduled within the time-frequency resources of the downlink data region. Unlike the legacy PDCCH, this new feature, known as Enhanced Physical Downlink Control Channel (EPDCCH), has the distinct characteristic of using Demodulation Reference Signals (DM-RS) for demodulation.

The EPDCCH transmission may be either localised or distributed with the granularity of one PRB pair. With localised transmission, the EPDCCH for a receiver is preferably transmitted over a single PRB pair, or, in some cases, over a few consecutive PRB pairs, scheduled by the associated eNodeB based on Channel Quality Indicator (CQI) feedback information (frequency selective scheduling). CQI is a measurement of the communication quality of wireless channels. CQI may comprise a value, or values, representing a measure of channel quality for a given channel. Typically, a high value CQI is indicative of a channel with high quality and vice versa.

With distributed transmission, the EPDCCH is transmitted over multiple PRB pairs spread over the downlink system bandwidth to achieve frequency diversity. The latter scheme is useful if there is no feedback or the available feedback is not reliable, although more resources (i.e., PRBs) are locked for EPDCCH transmission.

The EPDCCH design is based on a mobile station specifically configured search space. In particular, for a given receiver, the serving network node (i.e., eNodeB) may allocate up to two sets of PRB pairs for EPDCCH transmission (EPDCCH sets in LTE terminology), where each set may comprise M={2, 4 or 8} PRB pairs. Each EPDCCH set may be configured for either localized or distributed EPDCCH transmission. To assure that all PRB pairs within an EPDCCH set have the same number of available resource elements for EPDCCH transmission, PRB pairs containing the Physical Broadcast Channel (PBCH) and/or synchronisation signals (PSS/SSS) or positioning reference signals are not utilised for EPDCCH transmission. All available resource elements of each PRB pair within an EPDCCH set are mapped sequentially (first in frequency, then in time) into sixteen Enhanced Resource Element Groups (EREGs), hence yielding EREGs that may differ in size by at least one resource element. The basic unit block for EPDCCH multiplexing and blind decoding, the Enhanced Control Channel Element (ECCE), is formed by grouping a number of EREGs, which are selected either within a single PRB pair (for localised EPDCCH transmission) or across multiple PRB pairs (for distributed EPDCCH transmission) in such a way to assure that all ECCEs within an EPDCCH set have roughly the same size. An EPDCCH is then transmitted using an aggregation of one or several consecutive ECCEs, where the number of ECCEs used for one EPDCCH depends on the EPDCCH format as given by Table 1.

TABLE 1

| | Number of ECCEs for one EPDCCH, $N_{EPDCCH}^{ECCE}$ | | | |
|---|---|---|---|---|
| | Case 1 | | Case 2 | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

Future releases of the LTE system will introduce a New Carrier Type (NCT) that may be either synchronised or unsynchronised with the existing legacy carrier. A more ambitious vision is a standalone NCT. A major characteristic of this new carrier is the absence of a legacy downlink control channel region, that is, downlink control information is conveyed primarily through EPDCCH. Therefore, to ensure that a sufficient number of resources are available for EPDCCH, it may be desirable to make all PRB pairs in the downlink frequency bandwidth of the new carrier available to be configured for EPDCCH transmission, despite the presence of signals, such as e.g., reference signals, that may occupy only part of the downlink frequency bandwidth in a given subframe. The consequence is thus that an EPDCCH set may comprise PRB pairs having different number of resource elements available for the EPDCCH. This implies that the sizes of the ECCEs for localised EPDCCH are different among PRB pairs, and are possibly also different for the case of distributed EPDCCH transmission. For instance, for the design of at least an unsynchronised new carrier type, the six central PRB pairs contain PSS/SSS and if a standalone NCT will be specified, these PRB pairs would also be used for the transmission of broadcast information. To avoid waste of resources for small system bandwidths, an EPDCCH set may comprise all or some of the 6 central PRB pairs together with other PRB pairs.

In the prior art LTE system, for the transmission of an EPDCCH to a receiver, a serving network node allocates up to two sets of PRB pairs (i.e., EPDCCH sets in LTE terminology). The available resource elements in each PRB pairs of a set are mapped into 16 Enhanced Resource Element Groups (EREGs), whose size depends on reference signal configurations, such as e.g., Common Reference Signal (CRS), Channel State Information Reference Signals (CSI-RS), Demodulation Reference Signal (DM-RS), subframe type as well as control region length.

CSI-RS is a sparse receiver-specific reference signal used primarily for estimating Channel State Information (CSI) such as, e.g., Channel Quality Indicator (CQI), Pre-coding Matrix Indicator (PMI), Rank Indicator (RI), which the receiver reports to the transmitter/eNodeB. The CSI-RS is transmitted in all resource blocks of the carrier but with a configurable period in time and it is much sparser than the CRS. Up to 8 CSI-RS antenna ports may be accommodated.

Yet another downlink reference signal defined in LTE is Demodulation Reference Signal (DM-RS). DM-RS is a receiver-specific reference signal used primarily as phase and amplitude reference for coherent demodulation, i.e., to be used in channel estimation. It is only transmitted in the resource blocks and subframes where the receiver has been scheduled data, i.e., containing the PDSCH, or downlink control channel, i.e., containing the EPDCCH. Up to 8 DM-RS antenna ports may be accommodated.

The DM-RS time-frequency patterns for LTE are defined in the Technical Specification: 3GPP TS36.211 (retrievable over the Internet from: http://www.3gpp.org).

EREGs are grouped into Enhanced Control Channel Element (ECCE) in a way that different ECCEs have roughly the same amount of resource elements. For decoding the downlink control channel, a receiver blindly decodes the downlink control channel on a set of possible time-frequency resource positions (i.e., EPDCCH candidates in LTE terminology) formed by the aggregation of one or several ECCEs according to Table 1. The number of EPDCCH candidates per aggregation level is specified in the standard and depends on the number and sizes of the EPDCCH sets.

The supported numbers of ECCEs forming and EPDCCH candidate (i.e., the aggregation level) depend on the number of available resource elements in the PRB pairs as given in Table 1, which defines two sets of possible aggregation levels for both distributed and localized EPDCCH transmission. As the current LTE design assures that all PRB pairs within an EPDCCH set have the same number $n_{EPDCCH}$ of resource elements available for EPDCCH transmission, the quantity $n_{EPDCCH}$ characterises the entire EPDCCH set and is used to discriminate between the two sets of aggregation levels. In particular, Case 1 provides a larger value of both the minimum and the maximum aggregation levels for both distributed and localised transmission and applies when:

DCI formats 2, 2A, 2B, 2C or 2D is used and the downlink system bandwidth is larger than 25 resource blocks; or Any DCI format when $n_{EPDCCH}<104$ and normal cyclic prefix is used in normal subframes or special subframes with configuration 3, 4, 8.

The threshold value of 104 downlink resource elements available for EPDCCH transmission in a physical resource block pair has been determined to guarantee a worst case code rate of roughly 0.8 when an EPDCCH consists of one ECCE.

To assure that the PRB pairs within an EPDCCH set have the same number of resource elements for EPDCCH transmission, PRB pairs carrying the Physical Broadcast Channel (PBCH), and/or synchronisation signals, such as i.e., PSS/SSS in the LTE system, or positioning signals are not used an EPDCCH set in the LTE Rel.-11.

In future evolution of the LTE system, this design restriction may be relaxed to avoid waste of resources. For instance, for the design of an unsynchronised New Carrier Type (NCT), or a standalone NCT, an EPDCCH set may need to include all or some of the PRB pairs used for the transmission of synchronisation signals and/or broadcast channel to avoid subframes where no control information neither data are transmitted. It could also be envisaged to transmit other signals (e.g., reference signals) over only part of the bandwidth. The consequence is that a serving cell may configure an EPDCCH set formed by PRB pairs having different number of resource elements available for the transmission of the downlink control channel. Thus, both the serving cell transmitting an EPDCCH and the intended receiver must determine unambiguously the aggregation levels that apply to all PRB pairs within an EPDCCH set.

SUMMARY

It is therefore an object to obviate at least some of the above mentioned disadvantages and to improve the performance in a wireless communication system.

According to some embodiments, a method for transmitting and receiving downlink control channel signals within a set of Physical Resource Block (PRB) pairs is provided, where said PRB pairs do not necessarily have the same number of available resource elements. In such a system, the receiver may require to determine the supported sizes of the candidate downlink control channel signals prior attempting to decode the information. When the size of a candidate downlink control channel signal is expressed by the number of aggregated basic unit blocks (i.e., ECCEs in LTE) forming the control channel signal, and the admissible sizes of a control channel signal (i.e., aggregation level in LTE) depends on the number of available resource element in each PRB pair, a set of PRB pairs with different number of available downlink resource elements may create ambiguity in the supported sizes of the candidate downlink control channel signal. To resolve this ambiguity, new methods for determining the admissible sizes of a candidate downlink control channel signal within the set of configured PRB pairs need to be considered.

According to a first aspect, the object is achieved by a method in a radio network node, for transmission of a downlink control channel within a downlink frequency carrier of a wireless communication system. At least two PRB pairs configurable for the transmission of a downlink control channel have, in at least one subframe, different numbers of time-frequency resource elements available for the transmission of said downlink control channel. The method comprises allocating at least one set S of PRB pairs. Further, the method comprises arranging time-frequency resource elements from said set S into an aggregation comprising at least one level. Additionally, the method comprises determining a set LS of aggregation levels supported for the transmission of a downlink control channel within the allocated set of PRB pairs, based on the number of time-frequency resource elements available for the transmission of said downlink control channel in PRB pairs of the set S. Also, furthermore, the method comprises transmitting the downlink control channel within said set S of PRB pairs.

According to a second aspect, the object is achieved by a radio network node, for transmission of a downlink control channel within a downlink frequency carrier of a wireless communication system, wherein at least two PRB pairs configurable for the transmission of a downlink control channel have, in at least one subframe, different numbers of time-frequency resource elements available for the transmission of said downlink control channel. The radio network node comprises a processing circuit, configured for allocating at least one set of PRB pairs. The processing circuit is also configured for allocating at least one set of PRB pairs, and additionally configured for determining the set LS of aggregation levels supported for the transmission of a downlink control channel within the allocated set S of PRB pairs, based on the number of time-frequency resource elements available for the transmission of said downlink control channel in PRB pairs of the set S. Additionally, the radio network node also comprises a transmitting unit, configured for transmitting the downlink control channel within said set S of PRB pairs.

According to a third aspect, the object is achieved by a method in a receiver. The receiver is configured for receiving and decoding of a downlink control channel over a set of PRB pairs, for the transmission of the downlink control in at least one subframe. The method comprises determining a set LS of aggregation levels that is usable to transmit downlink control signals within the set S of PRB pairs received from a radio network node. Further, the method comprises decoding the possible positions of the downlink control channel within the set S.

According to a fourth aspect, the object is achieved by a receiver. The receiver is configured for receiving and decoding of a downlink control channel over a set of PRB pairs, for the transmission of the downlink control in at least one subframe. The receiver comprises a receiving unit, configured for receiving downlink control channel signals over the set S of PRB pairs from a radio network node. Furthermore, the receiver comprises a processing circuit, configured for determining a set LS of aggregation levels that is usable to transmit downlink control signals within a set S of PRB pairs, and also configured for decoding the possible positions downlink control channel within the set S.

Some advantages according to embodiments herein comprise the ability to efficiently multiplex data/control information in the same subframe where the transmission of certain signals, such as, e.g., broadcast information transmission, reference signals, synchronization signals, positioning signals etc., occupies only part of the downlink frequency bandwidth.

Thereby is a reasonable trade-off between signalling overhead and performance achieved. Thus an improved performance and spectral utilisation within the wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION OF ILLUSTRATIVE EMBODIMENTS

Embodiments of the invention described herein are defined as a radio network node, a method in a radio network node, a receiver and a method in a receiver, which may be put into practice in the embodiments described below. These embodiments may, however, be exemplified and realized in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
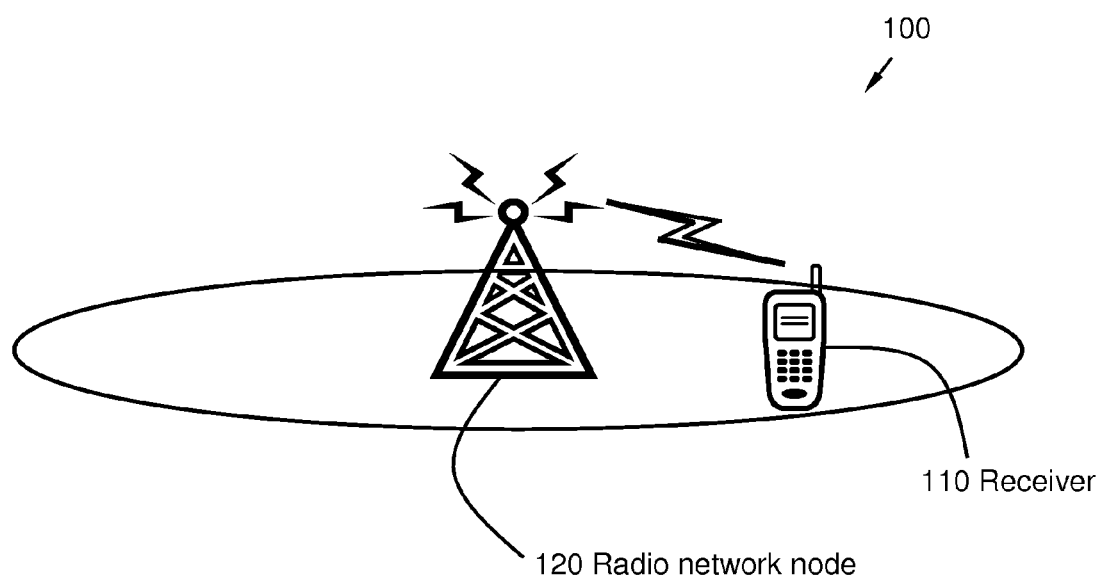
FIG. 1 is a block diagram illustrating an embodiment of the invention.

FIG. 1 is a schematic illustration of a wireless communication system 100. The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1x RTT and High Rate Packet Data (HRPD), just to mention some few options. The expressions "wireless network" and "wireless system" may within the technological context of this disclosure sometimes be utilised interchangeably.

The wireless communication system 100 may be deployed to provide various communication services such as voice, video, packet data, messaging, broadcast, etc., according to different embodiments.

Further, the wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period situated in the time domain between the uplink and downlink signalling. FDD means that the transmitter and receiver operate at different carrier frequencies, as have previously been discussed.

Further, the wireless communication system 100 may comprise a heterogeneous and/or a homogenous wireless communication network.

The purpose of the illustration in FIG. 1 is to provide a simplified, general overview of the wireless communication system 100 and the involved methods and nodes, such as the radio network node and receiver herein described, and the functionalities involved. The methods, radio network node and receiver will subsequently, as a non-limiting example, be described in a 3GPP/LTE environment, but the embodiments of the disclosed methods, radio network node and receiver may operate in a wireless communication system 100 based on another access technology such as, e.g., any of the above enumerated. Thus, although the embodiments of the invention are described based on, and using the lingo of, 3GPP LTE systems, it is by no means limited to 3GPP LTE.

The illustrated wireless communication system 100 comprises a receiver 110 and a radio network node 120, which is serving at least one cell.

The radio network node 120 controls the radio resource management within the cell, such as, e.g., allocating radio resources to the receiver 110 within the cell and ensuring reliable wireless communication between the radio network node 120 and the receiver 110. The radio network node 120 may typically comprise an eNodeB, e.g., in an LTE-related wireless communication system 100.

The receiver 110 is configured to transmit radio signals comprising information to be received by the radio network node 120. Correspondingly, the receiver 110 is configured to receive radio signals comprising information transmitted by the radio network node 120.

It is to be noted that the illustrated network setting of one receiver 110 and one radio network node 120 in FIG. 1 is to be regarded as a non-limiting example of an embodiment only. The wireless communication system 100 may comprise any other number and/or combination of radio network nodes 120 and/or receivers 110, although only one instance of a receiver 110 and a radio network node 120, respectively, are illustrated in FIG. 1, for clarity reasons. A plurality of receivers 110 and radio network nodes 120 may further be involved in some embodiments of the disclosed invention.

Thus whenever "one" or "a/an" receiver 110 and/or radio network node 120 is referred to in the present context, a plurality of receivers 110 and/or radio network nodes 120 may be involved, according to some embodiments.

The receiver 110 may be represented by, e.g., a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 120, according to different embodiments and different vocabulary.

The radio network node 120 may according to some embodiments be referred to as, e.g., base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 110 over a wireless interface, depending, e.g., of the radio access technology and terminology used.

In the sequel, the terminology from the 3GPP LTE system (PBCH, PDSCH, EPDCCH, reference signals etc.) is occasionally used. However, interchangeably more general notions of channels and signals may be considered, with the same or similar functionality and properties.

Embodiments of the invention herein disclose the wireless communication system 100 with a downlink carrier where at least two PRB pairs can have, in at least one subframe, different number of time-frequency resource elements available for the transmission of a downlink control channel. In prior art, such as the LTE system, PRB pairs that can be allocated for the transmission of downlink control channel must have, in any subframe, the same number of time-frequency resource elements available for the transmission of the downlink control channel.

In a first embodiment the radio network node 120, or serving cell, transmitting the downlink control channel allocates, for the transmission of the downlink control channel, at least one set S comprising PRB pairs that, in any subframe, have all the same number of physical time-frequency resource elements available for the transmission of the control channel. It is intended that the methods applies to subframes configured for the transmission of downlink control channel signals.

A first benefit of this method is to allow multiplexing data/control information in the same subframe where the transmission of certain, such as e.g., reference signals, synchronization signals, positioning signals, etc. occupies only part of the downlink frequency bandwidth. In the related art LTE system, this method allows, for instance, to transmit a downlink control channel also within the six central physical resource block pairs of a downlink carrier, which are periodically used for the transmission of the physical broadcast channel and/or synchronization signals. In this case, the serving cell needs to allocate at least one set of PRB pairs taken among the six central PRB pairs of the downlink carrier, and the current LTE allocation scheme could be extended to allocate a set of six PRB pairs for the transmission of downlink control channel. The benefit of this method is that no additional change is required to determine, at both the serving cell and the intended receiver, the set of aggregation levels supported for the transmission of downlink control channel in the allocated set of PRB pairs when the allocation of PRB pairs to said set can use any arbitrary PRB pair in the downlink frequency bandwidth. However, the methods described herein are not limited to the six central physical resource block pairs of a downlink carrier, which is mentioned merely as an exemplary embodiment.

In another alternative, the radio network node 120, or serving cell, allocates at least one set of PRB pairs for the transmission of a downlink control channel, where at least two PRB pairs in at least one subframe have different number of time-frequency resource elements available for the transmission of downlink control channel signals. We consider a set S of $N_{RB}^S$ PRB pairs allocated for the possible transmission of a downlink control channel, and let $n_{EPDCCH,i}$ denote the number of time-frequency resource elements available in each PRB pair $i=0, \ldots, N_{RB}^S-1$ within the set for the transmission of said downlink control channel. For a given transmission method of downlink control channel, e.g., localized transmission or distributed transmission, let $L1=\{l_1^{(1)}, l_2^{(1)}, \ldots, l_{K_1}^{(1)}\}$ and let $L2=\{l_1^{(2)}, l_2^{(2)}, \ldots, l_{K_2}^{(2)}\}$ denote two sets of aggregation levels supported for the transmission of downlink control channel signals within the PRB pair set S. An aggregation level may be represented as a positive integer, denoting the number of ECCEs utilised for transmitting the downlink control channel. In the related art LTE system, for instance, for a given transmission method (localized or distributed) the sets L1 and L2 may correspond to the columns of Case-1 and Case-2 in Table 1, respectively.

In one embodiment, the radio network node 120, or serving cell transmitting the downlink control channel may compute the number of time-frequency resource elements $n_{EPDCCH,i}$ available within each PRB pair i of the PRB pairs set S, for the transmission of downlink control channel. If there exists any two distinct PRB pairs i, j∈ S with i≠j such that $n_{EPDCCH,i} < X_{Thresh}$ and $n_{EPDCCH,j} \geq X_{Thresh}$, where $X_{Thresh}$ is a threshold, which may be related to the number of time-frequency resource elements per PRB pair available for the transmission of downlink control channel signals, then the set LS of aggregation levels supported for downlink control channel transmission within the PRB pair set S is given by the intersection of the two sets L1 and L2, according to the following relation:

$$LS = L1 \cap L2 \quad \text{[Equation 1]}$$

The conditions $n_{EPDCCH,i} < X_{Thresh}$ and $n_{EPDCCH,j} \geq X_{Thresh}$ imply $n_{EPDCCH,i} \neq n_{EPDCCH,j}$. For instance, considering Table 1, for the case of localized EPDCCH transmission, equation (1) would yield LS=\{2,4,8\} if any two PRB pairs i, j∈ S with i≠j fulfil the condition $n_{EPDCCH,i} < 104$ and $n_{EPDCCH,j} \geq 104$. The value $X_{thresh}=104$ time-frequency resource elements is chosen to fulfil a code rate of at least 0.8 for a DCI format 1A and aggregation level 1, assuming a PRB pair formed by four ECCEs. The code rate represents the number of information bits that can be conveyed per physical time-frequency resource unit for a given modulation scheme.

In another alternative embodiment, when there exist any two distinct PRB pairs i, j ∈ S with i≠j such that $n_{EPDCCH,i} < X_{Thresh}$ and $n_{EPDCCH,j} \geq X_{Thresh}$, where $X_{Thresh}$ is a threshold; letting l1 =inf L1 and l2 =inf L2 denote the smallest elements of the sets L1 and L2, respectively, then the set of aggregation levels supported for the transmission of downlink control channel within the PRB pair set S is given by the following relation:

$$LS = L\tilde{i} \quad \text{[Equation 2]}$$

where $$\tilde{i} = \arg\max_{i=1,2} li$$

For instance, considering the case of Table 1, this embodiment returns the configuration in case 1 for both localized and distributed EPDCCH transmission whenever an EPDCCH set contains at least one physical resource block pair satisfying the condition $n_{EPDCCH} < 104$, i.e., with less than 104 time-frequency resource elements available for downlink control channel transmission.

This embodiment has the benefit that a single set of aggregation levels is applied to all PRB pairs in an EPDCCH set regardless the different number of time-frequency resource elements available for downlink control channel transmission in the various PRB pairs within the allocated set S. Furthermore, it assures that the downlink control channel can be transmitted with a reasonable (e.g., <0.8) code rate for any possible positions of the downlink control channel within the set S since the resulting minimum aggregation level is sufficient. The arrangement according to equation 2 also implies that the number of possible positions of the downlink control channel within the set S allocated to the different aggregation levels can remain the same as in a system wherein all PRB pairs have the same number of time-frequency resource elements available for the downlink control channel since the number of supported aggregation levels does not change.

In another embodiment, the radio network node 120, or serving cell transmitting a downlink control channel within a set S of PRB pairs selects one among two sets of aggregation levels L1 and L2 respectively, defined for a given transmission method of a downlink control channel, by the following steps:

1. computing the number $n_{EPDCCH,i}$ of time-frequency resource elements available in each PRB pair i ∈ S for the transmission of downlink control channel signals;
2. computing a parameter $n_{EPDCCH}$ reflecting the time-frequency resource elements available in all PRB pairs within the set S as a function of all $n_{EPDCCH,i}$:

$$n_{EPDCCH} = f(n_{EPDCCH,0}, \ldots, n_{EPDCCH,N_{RB}^S-1}) \quad \text{[Equation 3]}$$

3. selecting L1 if $n_{EPDCCH} < X_{Thresh}$ and L2 otherwise, where $X_{Thresh}$ is a threshold, which may be related to the number of time-frequency resource elements per PRB pair available for the transmission of downlink control channel.

The explicit function defining the parameter $n_{EPDCCH}$ can be chosen as, but not limited to, one the following:

1. the minimum among all $n_{EPDCCH,i}$, i.e., $$n_{EPDCCH} = \min_{i=0, \ldots, N_{RB}^S-1} n_{EPDCCH,i};$$

2. the maximum among all $n_{EPDCCH,i}$, i.e., $$n_{EPDCCH} = \max_{i=0, \ldots, N_{RB}^S-1} n_{EPDCCH,i};$$

3. the average among all $n_{EPDCCH,i}$, i.e., $$n_{EPDCCH} = \frac{1}{N_{RB}^S} \sum_{j=0}^{N_{RB}^S-1} n_{EPDCCH,i},$$

where $N_{RB}^S$ is the number of PRB pairs within the set S;

4. the difference between the largest and the smallest $n_{EPDCCH,i}$, i.e., $$n_{EPDCCH} = \max_{i=0, \ldots, N_{RB}^S-1} n_{EPDCCH,i} - \min_{i=0, \ldots, N_{RB}^S-1} n_{EPDCCH,i}.$$

The quantity $n_{EPDCCH}$ characterises the entire EPDCCH set and may be used to select the set of aggregation levels, e.g., the number of ECCEs forming an EPDCCH in an LTE system. Considering Table 1 and assuming that the number of ECCEs for one EPDCCH in case 1 and case 2 correspond to the sets of aggregation levels L1 and L2 for a given transmission method, respectively, L1 may be chosen when $n_{EPDCCH} < 104$.

An advantage of using a minimum operator such as $$n_{EPDCCH} = \min_{i=0, \ldots, N_{RB}^S-1} n_{EPDCCH,i}$$

is that it assures that the downlink control channel can be transmitted with a reasonable (e.g., <0.8) code rate for any possible position of the downlink control channel within the set S since the minimum aggregation level is determined based on the PRB pair with the smallest EREG size. An advantage of using a maximum operator such as $$n_{EPDCCH} = \max_{i=0, \ldots, N_{RB}^S-1} n_{EPDCCH,i}$$

is typically that a smaller aggregation level will be supported. This may improve the resource utilization since the EPDCCH could in some instances be transmitted on aggregation level 1.

In one embodiment, the serving cell transmitting a downlink control channel within a set S of PRB pairs, selects one out of two sets of aggregation levels, L1 and L2 respectively, defined for a given transmission method of downlink control channel signals, by the following steps.

1. computing the number $n_{EPDCCH,i}$ of time-frequency resource elements available in each PRB pair i∈ S for the transmission of downlink control channel signals;
2. counting the number K of PRB pairs for which $n_{EPDCCH,i}$ does not exceeds a threshold $X_{Thresh}$, which may be related to the number of time-frequency resource elements per PRB pair available for the transmission of downlink control channel signals;
3. selecting L1 when $f(K, N_{RB}^S) < X_{Thresh}^{RB}$ and L2 otherwise, where $X_{Thresh}^{RB}$ is a threshold, which may be related to the number of physical resource block pairs available for the transmission of the downlink control channel, and $f(K, N_{RB}^S)$ is a function of K and $N_{RB}^S$, wherein the explicit function $f(K, N_{RB}^S)$ can be chosen as, but not limited to, one the following:
   a. the number of PRB pairs for which $n_{EPDCCH,i}$ does not exceed a threshold $X_{Thresh}$, i.e., $f(K, N_{RB}^S) = K$;
   b. the number of PRB pairs for which $n_{EPDCCH,i}$ is larger than or equal to a threshold $X_{Thresh}$, i.e., $f(K, N_{RB}^S) = N_{RB}^S - K$;
   c. the ratio between the number of PRB pairs for which $n_{EPDCCH,i}$ does not exceed a threshold $X_{Thresh}$, and the number of PRB pairs for which $n_{EPDCCH,i}$ is larger than or equal to a threshold $X_{Thresh}$, i.e., $$f(K, N_{RB}^S) = \frac{K}{N_{RB}^S - K};$$

d. the ratio between the number of PRB pairs for which $n_{EPDCCH,i}$ is larger than or equal to a threshold $X_{Thresh}$, and the number of PRB pairs for which $n_{EPDCCH,i}$ does not exceed a threshold $X_{Thresh}$, i.e., $$f(K, N_{RB}^S) = \frac{N_{RB}^S - K}{K};$$

e. the ratio between the number of PRB pairs for which $n_{EPDCCH,i}$ does not exceed a threshold $X_{Thresh}$, and the total number of PRB pairs within the set S, i.e., $$f(K, N_{RB}^S) = \frac{K}{N_{RB}^S};$$

f. the ratio between the number of PRB pairs for which $n_{EPDCCH,i}$ is larger than or equal to a threshold $X_{Thresh}$, and the total number of PRB pairs within the set S, i.e., $$f(K, N_{RB}^S) = \frac{N_{RB}^S - K}{N_{RB}^S}.$$

A benefit of this is that a reduced complexity, in particular at the receiver 110, for the computation of the set of aggregation levels supported by the set of PRB pairs allocated for the transmission of downlink control channel.

In another embodiment, the radio network node 120, i.e., the serving cell, transmitting a downlink control channel signal within a set S of PRB pairs, where time-frequency resource elements of are grouped into a number n=0, . . . , N−1 of basic unit blocks, ECCEs in an LTE system, aggregated to form possible positions of the downlink control channel within the set S, selects one out of two sets of aggregation levels, L1 and L2 respectively, defined for a given transmission method of downlink control channel signals, by the following steps.
1. computing the number $n_{ECCE,n}$ of time-frequency resource elements in each ECCE n=0, . . . , N−1 within the set S available for the transmission of the downlink control channel;
2. computing a parameter $n_{ECCE}$ reflecting the number of time-frequency resource elements available per ECCE within the set S as a function of all $n_{ECCE,n}$, according to the following relation:

$$n_{ECCE} = f(n_{ECCE,0}, \ldots, n_{ECCE,N-1}) \quad \text{[Equation 4]}$$

3. selecting L1 when $n_{ECCE} < X_{Thresh}^{ECCE}$ and L2 otherwise, where $X_{Thresh}^{EDDE}$ is a threshold, which may be related to the number of time-frequency resource elements per PRB pair available for the transmission of downlink control channel signals.

The explicit function defining the parameter $n_{ECCE}$ can be chosen as, but not limited to, one the following:
1. the minimum among all $n_{ECCE,n}$, i.e., $$n_{ECCE} = \min_{n=0, \ldots, N-1} n_{ECCE,n};$$

2. the maximum among all $n_{ECCE,n}$, i.e., $$n_{ECCE} = \max_{n=0, \ldots, N-1} n_{ECCE,n};$$

3. the average among all $n_{ECCE,n}$, i.e., $$n_{ECCE} = \frac{1}{N} \sum_{n=0}^{N-1} n_{ECCE,n};$$

4. the difference between the smallest and the largest $n_{ECCE,n}$, i.e., $$n_{ECCE} = \max_{n=0, \ldots, N-1} n_{ECCE,n} - \min_{n=0, \ldots, N-1} n_{ECCE,n}.$$

In the related art LTE system, the radio network node 120, or serving cell, determines the set of aggregation levels, i.e., number of ECCEs per EPDCCH, supported in an EPDCCH set by comparing the number of time-frequency resource elements available in the PRB pairs within an EPDCCH set with a threshold reflecting a worst case coding rate (about 0.8). Following a similar principle, the new threshold defined for $n_{ECCE}$ could be taken as $X_{thresh}^{ECCE} = f(X_{thresh})$, where $X_{thresh}$ is a threshold, which may be related to the number of time-frequency resource elements per PRB pair available for the transmission of downlink control channel signals and/or to the payload of the downlink control channel signal (e.g., to the DCI format in the LTE system). For instance, in the related art LTE system, Table 1 uses $X_{thresh} = 104$ time-frequency resource elements to fulfil a code rate of at most 0.8 for a DCI format 1A and aggregation level 1, assuming a PRB pair consisting of four ECCE.

Following the same principle: $X_{thresh}^{ECCE} = \lceil X_{thresh}/4 \rceil$. It is to be noticed, that using the condition $$n_{ECCE} = \min_{n=0,\ldots,N-1} n_{ECCE,n}$$

is equivalent to require that any ECCE size exceeds threshold to select a set that ensures higher aggregation levels, according to some embodiments.

In another embodiment, the parameter $n_{ECCE}$ reflects the number of available time-frequency resource elements for all ECCEs within the downlink control channel search space of a receiver 110. The receiver 110 computes $n_{ECCE}$ and the set of aggregation levels according to a previous embodiment with the difference that only ECCEs forming possible positions of the downlink control channel within the set S within the EPDCCH search space of the receiver 110 are considered. The benefit of this embodiment is to reduce the computation complexity of $n_{ECCE}$.

Thus, in some embodiments, the radio network node 120, i.e., the serving cell, transmitting a downlink control channel signal within a set S of PRB pairs, where time-frequency resource elements are grouped into a number $n=0,\ldots,N-1$ of ECCEs in the search space of the receiver 110, and ECCEs are aggregated to form possible positions of the downlink control channel within the set S, selects one out of two sets of aggregation levels, L1 and L2 respectively, defined for a given transmission method of downlink control channel signals, by the following steps:

1. computing the number $n_{ECCE,n}$, of time-frequency resource elements in each ECCE $n=0,\ldots,N-1$ within the search space of the receiver 110;
2. computing a parameter $n_{ECCE}$ reflecting the number of time-frequency resource elements available per ECCE within the set S as a function of all $n_{ECCE,n}$, such that $$n_{ECCE} = f(n_{ECCE,0},\ldots, n_{ECCE,N-1}) \quad \text{[Equation 5]}$$

3. selecting L1 when $n_{ECCE} < X_{Thresh}^{ECCE}$ and L2 otherwise, where $X_{Thresh}^{ECCE}$ is a threshold, which may be related to the number of time-frequency resource elements per PRB pair available for the transmission of downlink control channel signals.

The explicit function defining the parameter $n_{ECCE}$ can be chosen as, but not limited to, one the following:

1. the minimum among all $n_{ECCE,n}$, i.e., $$n_{ECCE} = \min_{n=0,\ldots,N-1} n_{ECCE,n};$$

2. the maximum among all $n_{ECCE,n}$, i.e., $$n_{ECCE} = \max_{n=0,\ldots,N-1} n_{ECCE,n};$$

3. the average among all $n_{ECCE,n}$, i.e., $$n_{ECCE} = \frac{1}{N}\sum_{n=0}^{N-1} n_{ECCE,n};$$

4. the difference between the smallest and the largest $n_{ECCE,n}$, i.e., $$n_{ECCE} = \max_{n=0,\ldots,N-1} n_{ECCE,n} - \min_{n=0,\ldots,N-1} n_{ECCE,n}.$$

The previous embodiments follow the paradigm that all time-frequency resource elements available in each PRB pair of a set allocated for the transmission of downlink control channel are utilised. For instance, in the related art LTE system, all time-frequency resource elements available within each PRB pair of an EPDCCH set are mapped sequentially, e.g., first in frequency, then in time, into a fixed number of EREGs such as i.e., 16 EREGs, hence generating EREGs that can differ in size by at least one resource element. An alternative method is to map EREGs to time-frequency resource elements so that all EREGs within the EPDCCH set or the search space have the same size. To this end, given a PRB pair set S allocated for the transmission of downlink control channel, the serving cell finds the PRB pair in S with the minimum amount of time-frequency resource elements available for the transmission of downlink control channel signals, i.e., $$\tilde{i} = \operatorname*{argmin}_{i=0,\ldots,N_{RB}^S} n_{EPDCCH,i}. \quad \text{[Equation 6]}$$

Hence, EREGs are mapped, according to some rule, to $n_{EPDCCH} = n_{EPDCCH,\tilde{i}}$ time-frequency resource elements in each PRB pairs within the set S. However, if $n_{EPDCCH} = n_{EPDCCH,\tilde{i}}$ is not an integer multiple of the number of EREGs, the size of some EREGs within each PRB pair will differ for at least one resource element. In the LTE rel-11, a similar issue is resolved by assuring that ECCEs formed by properly selecting groups of EREGs have roughly the same size. In alternative, one can further restrict the transmission of downlink control channel to use $n_{EPDCCH} = n_{EPDCCH,\tilde{i}} - n_{EPDCCH,\tilde{i}} \mod(M)$ time-frequency resource elements in each PRB pair of the set S, where M is the number of EREGs per PRB pair, so that to have EREGs with exactly the same size in all PRB pairs. The set of aggregation levels used in the set is determined on the basis of the effective number of time-frequency resource elements used in each PRB pair for the transmission of downlink control channel, i.e., $n_{EPDCCH}$, according to one of the criteria in the previous embodiments. A benefit of this embodiment may be that for both localized and distributed EPDCCH transmission, one can apply a unique set of aggregation levels. The dis-advantage, compared to the previous methods, is that several time-frequency resource elements may remain not utilised in each PRB pair of an EPDCCH set.

In the previous embodiments, both the radio network node 120 and the receiver 110 of a downlink control channel select a set of aggregation levels on the basis of the time-frequency resource elements available in each PRB pair allocated for the transmission of the downlink control channel. In the related art LTE system, for instance, the prerogative is that if the size of possible positions of the downlink control channel within the set S for aggregation level 1 (i.e., the ECCE size) leads to a too large code rate (~0.8), then a set that ensures an aggregation level larger than one is selected.

However, when the downlink control channel (e.g., EPDCCH) transmission is localized within a PRB pair and the PRB pair set allocated for the transmission of the downlink control channel consists of PRB pairs with different number of available time-frequency resource elements, for a given DCI format, an aggregation level 1 may yield a too large code rate in certain PRB pairs and a sufficiently low code rate in other PRB pairs. A similar condition may occur also when the downlink control channel transmission is distributed across multiple PRB pairs. In this case, it is beneficial to utilise the positions of the downlink control channel within the set S that fulfil the rate code requirement for aggregation level 1 rather than selecting a set that has an aggregation level of at least two. Hence, it would be assured that, for a given aggregation level (e.g., aggregation level 1), there would only remain possible positions of the downlink control channel within the set S for which a sufficient code rate can be fulfilled.

In one example, the possible positions of the downlink control channel within the set S which cannot provide a sufficiently low code rate are discarded; i.e., they are not used by the base station to transmit the control channel to the receiver 110, and accordingly, the receiver 110 does not need to try decoding those possible positions of the downlink control channel within the set S. This could result in a simple implementation in the receiver 110, which may not need increase the number of possible positions of the downlink control channel within the set S it searches for on any aggregation level.

In another example, it may be desirable to maintain the total number of useful possible control channel positions constant, hence the number of possible positions of the downlink control channel within the set S that are dropped for aggregation level 1 can be used, according to some specified rule, for higher aggregation levels. For instance, for the case of localized EPDCCH transmission in the LTE system, the base station can consider the set of aggregation level LS={1,2,4,8,16} formed by the union of the two sets defined in Table 1, with a number P of possible positions of the downlink control channel within the set S defined for aggregation levels 1 to 8 according to some rule, while aggregation levels 16 has as many potential possible positions of the downlink control channel within the set S as aggregation level 1. For a given DCI format, the serving cell verifies, in each PRB pair of the PRB pair set S, the possible positions of the downlink control channel within the set S for aggregation level 1 and discards the possible positions that yield a code rate larger than a given threshold. For any possible position of the downlink control channel within the set S discarded for aggregation level 1, one of the potential possible positions of the downlink control channel within the set S for aggregation level 16 is verified, so that the total number of useful possible positions P of the downlink control channel within the set S for the transmission of the downlink control channel remains constant. At the receiver, i.e., receiving mobile station, the corresponding method may be applied so that the total number of blind decoding attempt performed, i.e., P, remains constant. The benefit of this is that the same total number of possible positions of the downlink control channel within the set S is always provided, which may reduce the probability that an EPDCCH cannot be transmitted due to too few possible positions of the downlink control channel within the set S.

Figure 2:
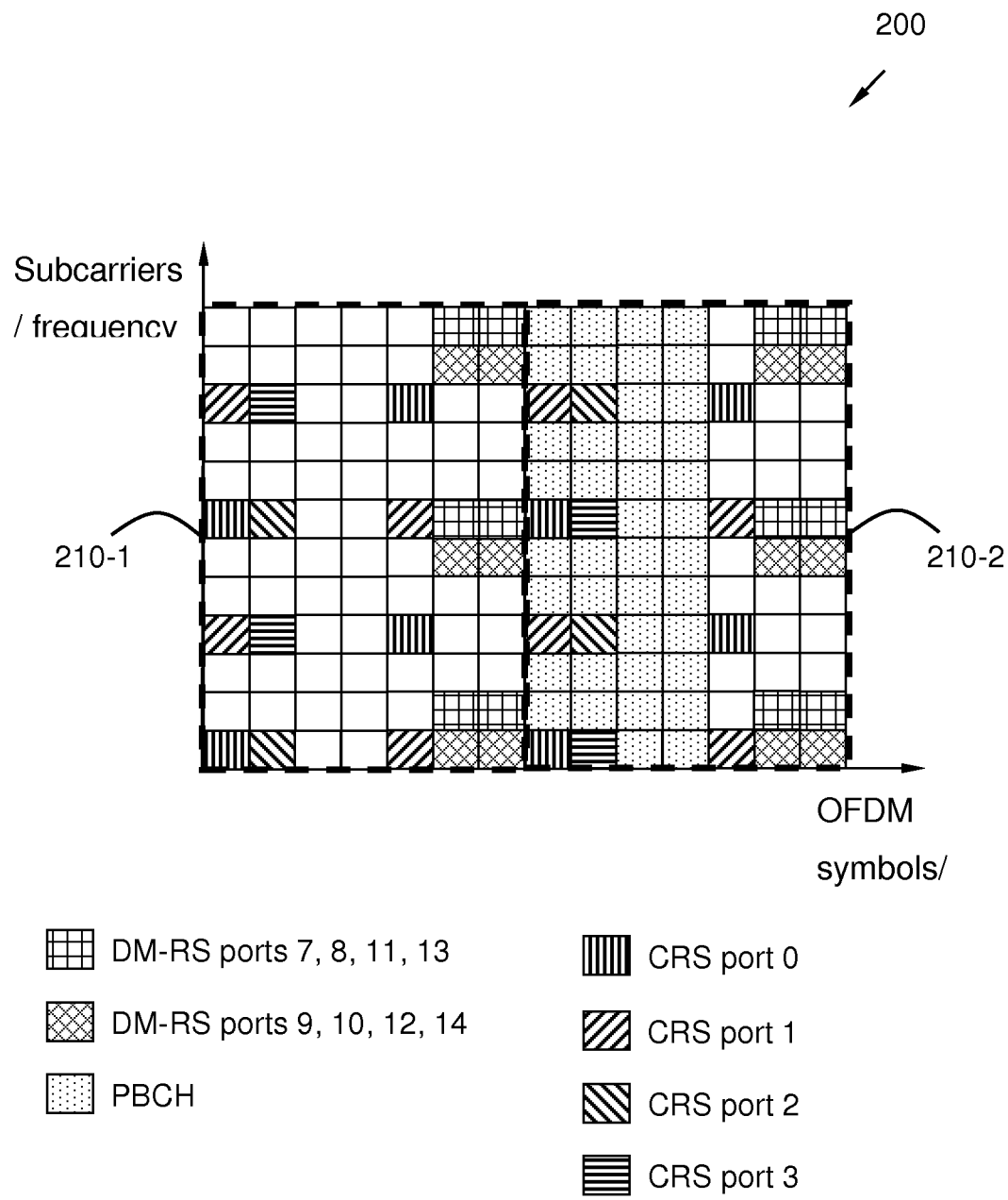
FIG. 2 is a block diagram illustrating a time-frequency resource grid according to an embodiment of the invention.

FIG. 2 shows an example wherein the time-frequency resources defined for antenna ports 9, 10, 12 and 14 are used by the antenna port(s) for the broadcast channel, in a subframe 200 comprising a first resource block 210-1 and a second resource block 210-2, which together are forming a resource block pair.

Figure 3:
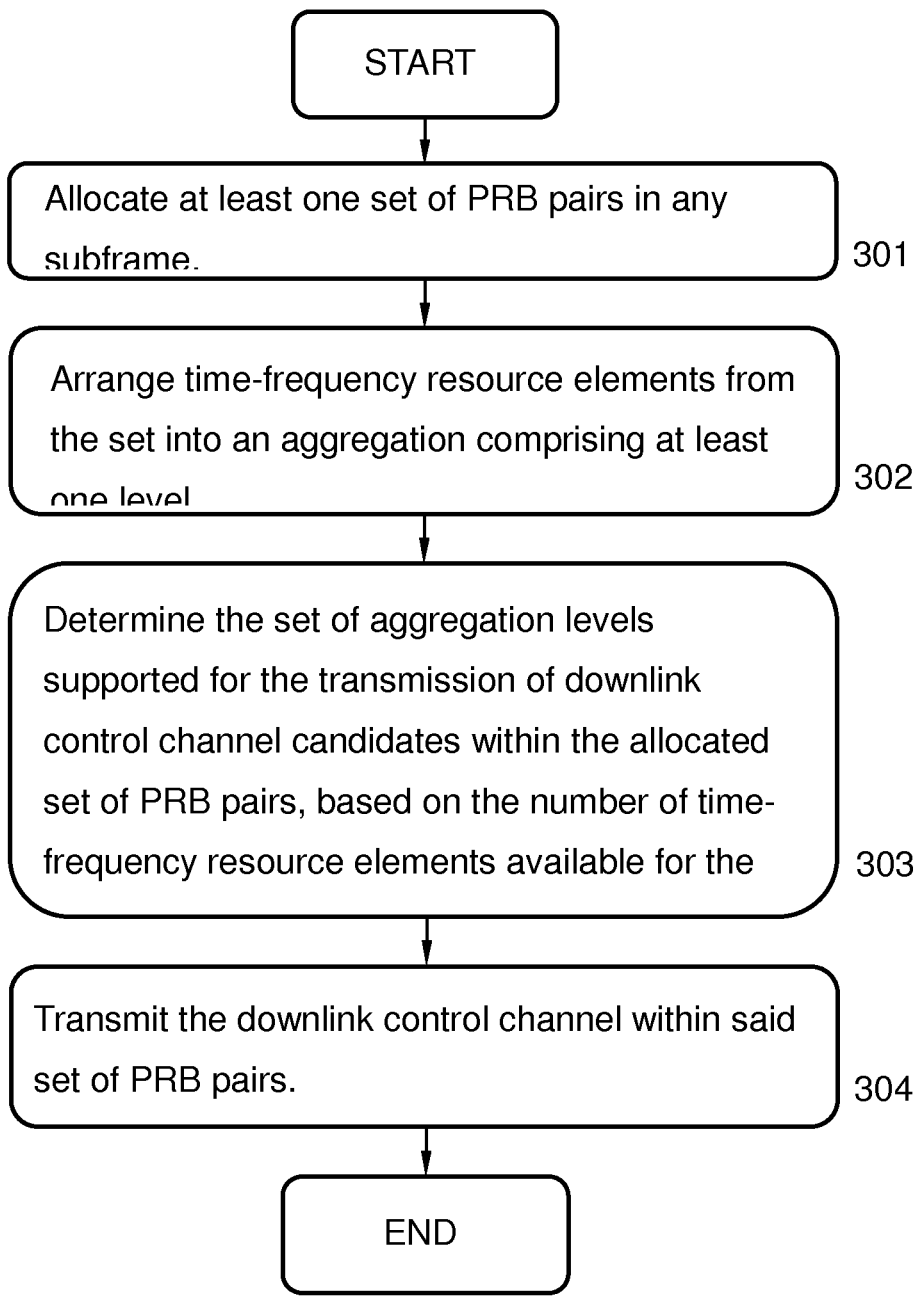
FIG. 3 is a flow chart illustrating a method in a radio network node according to an embodiment of the invention.

FIG. 3 is a flow chart illustrating embodiments of a method 300 in a radio network node 120 for transmission of downlink control channel signals in a downlink frequency carrier of a wireless communication system 100, wherein at least two PRB pairs configurable for the transmission of a downlink control channel that have, in at least one subframe 200, different numbers of time-frequency resource elements available for the transmission of said downlink control channel. Further, the downlink control channel signals are to be received by a receiver 110 in a wireless communication system 100.

The wireless communication system 100 may be based on an LTE system. The receiver 110 may be a User Equipment (UE). The radio network node 120 may be an evolved NodeB, eNodeB. The data channel may be a Physical Downlink Shared Channel (PDSCH). The control channel may be an Enhanced Physical Downlink Control Channel (EPDCCH). The aggregated basic unit block may be an Enhanced Control Channel Element (ECCE). The groups of elements used for defining correspondence between enhanced control channels and time-frequency resource elements may be Enhanced Resource Element Groups, EREGs.

To appropriately perform the transmission, the method 300 may comprise a number of actions 301-304. It is however to be noted that any, some or all of the described actions 301-304, may be performed in a somewhat different chronological order than the enumeration indicates, or even be performed simultaneously. The method 300 may comprise the following actions.

Action 301

At least one set S of PRB pairs is allocated.

The allocation may be performed by allocating at least one set S of PRB pairs having, in any subframe 200, in each PRB pair, the same number of time-frequency resource elements available for the transmission of a downlink control channel, according to some embodiments.

The allocation may be performed by allocating at least one set S of PRB pairs comprising at least two PRB pairs having, in at least one subframe 200, different numbers of time-frequency resource elements available for the transmission of a downlink control channel, according to some embodiments.

Action 302

The time-frequency resource elements from the set S of PRB pairs are arranged into an aggregation comprising at least one level.

Action 303

A set LS of aggregation levels supported for the transmission of a downlink control channel within the allocated 301 set of PRB pairs is determined, based on, at least, the number of time-frequency resource elements available for the transmission of a downlink control channel in PRB pairs of the set S.

The action of determining the set LS of aggregation levels may according to some embodiments comprise computing a parameter $n_{EPDCCH,\ i}$ that reflects the number of time-frequency resource elements available for the transmission of a downlink control channel in each PRB pair i of the allocated set S of PRB pairs, and determine from said parameters $n_{EPDCCH,\ i}$ a set LS of aggregation levels that is supportable by all PRB pairs in S.

The allocated set S of PRB pairs may according to some embodiments comprise at least two distinct PRB pairs i, j∈

S with i≠j such that $n_{EPDCCH,i}$<threshold and $n_{EPDCCH,j}$≥threshold, wherein the first PRB pair i may be supporting a first set L1 of aggregation levels and the second PRB pair j may be supporting a second set L2 of aggregation levels. The action of determining the set LS of aggregation levels may further comprise: determining the set LS of aggregation levels that is supportable by all PRB pairs in the set S by computing an intersection of the first set L1 of aggregation levels and the second set L2 of aggregation levels according to the following relation:

$$LS = L1 \cap L2.$$

The allocated set S of PRB pairs may comprise at least two distinct PRB pairs i, j ∈ S with i≠j such that $n_{EPDCCH,i}$<threshold and $n_{EPDCCH,j}$≥threshold, wherein the first PRB pair i may be supporting a first set L1 of aggregation levels and the second PRB pair j may be supporting a second set L2 of aggregation levels. Furthermore, the action of determining the set LS of aggregation levels may further comprise determining the smallest element l1 from the first set L1 and the smallest element l2 from the second set L2, and determining the set LS of aggregation levels that is supportable by all PRB pairs by computing the following relation:

$$LS = L\tilde{i},$$

where $$\tilde{i} = \underset{i=1,2}{\operatorname{argmax}} li$$

However, according to some embodiments, the action of determining the set LS of aggregation levels may comprise computing a parameter $n_{EPDCCH}$ reflecting the number of time-frequency resource elements available for the transmission of downlink control channel in any PRB pair within the allocated set S. Further, such embodiments may comprise to determine from said parameter $n_{EPDCCH}$, a set LS of aggregation levels that is supportable by all PRB pairs in the allocated set S.

According to some embodiments, the allocated set S of PRB pairs may comprise at least two distinct PRB pairs i, j ∈ S with i≠j such that $n_{EPDCCH,i}$<threshold and $n_{EPDCCH,j}$≥threshold, wherein the first PRB pair i may be supporting a first set L1 of aggregation levels and the second PRB pair j may be supporting a second set L2 of aggregation levels. Further, the action of determining the set LS of aggregation levels may further comprise selecting one of the first set L1 of aggregation levels and second set L2 of aggregation levels by computing the number $n_{EPDCCH,i}$ of time-frequency resource elements available in each PRB pair i ∈ S for the transmission of downlink control channel signals, according to some embodiments. Further, the action of determining, may comprise computing a parameter $n_{EPDCCH}$ reflecting the time-frequency resource elements available in all PRB pairs within the set S as a function of all $n_{EPDCCH,i}$: $n_{EPDCCH} = f(n_{EPDCCH,0}, \ldots, n_{EPDCCH,N_{RB}^S-1})$, where $N_{RB}^S$ is the number of PRB pairs within the set S. In addition, the action of determining may comprise selecting the first set L1 when $n_{EPDCCH}$<threshold, otherwise selecting the second set L2 of aggregation levels, where the threshold may be related to the number of time-frequency resource elements per PRB pair available for the transmission of downlink control channel, according to some embodiments.

Furthermore the action of computing the parameter $n_{EPDCCH}$ may be based on any of: determining the minimum among all $n_{EPDCCH,i}$, such that $$n_{EPDCCH} = \min_{i=0,\ldots,N_{RB}^S-1} n_{EPDCCH,i};$$

determining the maximum among all $n_{EPDCCH,i}$, such that $$n_{EPDCCH} = \max_{i=0,\ldots,N_{RB}^S-1} n_{EPDCCH,i};$$

computing the average among all $n_{EPDCCH,i}$, such that $$n_{EPDCCH} = \frac{1}{N_{RB}^S} \sum_{i=0}^{N_{RB}^S-1} n_{EPDCCH,i},$$

where $N_{RB}^S$ is the number of PRB pairs within the set S; computing the difference between the largest and the smallest $n_{EPDCCH,i}$, such that $$n_{EPDCCH} = \max_{i=0,\ldots,N_{RB}^S-1} n_{EPDCCH,i} - \min_{i=0,\ldots,N_{RB}^S-1} n_{EPDCCH,i},$$

or a similar algorithm according to different embodiments.

Furthermore, the action of determining the set LS of aggregation levels may comprise, according to some embodiments: computing a number of PRB pairs in the allocated set S of PRB pairs for which the number $n_{EPDCCH,i}$ of time-frequency resource elements available for the transmission of downlink control channel is less than a threshold value, and determine from said number of PRB pairs, a set LS of aggregation levels that is supportable by all PRB pairs in the set S.

According to some embodiments, the allocated set S of PRB pairs may comprise at least two distinct PRB pairs i, j ∈ S with i≠j such that $n_{EPDCCH,i}$<threshold and $n_{EPDCCH,j}$≥threshold, wherein the first PRB pair i is supporting a first set L1 of aggregation levels and the second PRB pair j is supporting a second set L2 of aggregation levels. The action of determining the set LS of aggregation levels may further comprise selecting one of the first set L1 of aggregation levels and second set L2 of aggregation levels by: computing the number $n_{EPDCCH,i}$ of time-frequency resource elements available in each PRB pair i ∈ S for the transmission of downlink control channel; counting the number K of PRB pairs for which $n_{EPDCCH,i}$ does not exceed a threshold, i.e., $n_{EPDCCH,i}$<threshold, related to the number of resource elements per PRB pair available for the transmission of downlink control channel; selecting the first set L1 when $f(K, N_{RB}^S)$<threshold2, otherwise selecting the second set L2 of aggregation levels, wherein the second threshold is related to the number of PRB pairs available for the transmission of downlink control channel signals, and $f(K, N_{RB}^S)$ is a function of K and $N_{RB}^S$. The function $f(K, N_{RB}^S)$ may optionally be selected from one of: the number of PRB pairs for which $n_{EPDCCH,i}$ does not exceed a threshold, such that $f(K, N_{RB}{}^S)=K$; the number of PRB pairs for which $n_{EPDCCH,i}$ is larger than or equal to the threshold, such that $f(K, N_{RB}{}^S)=N_{RB}{}^S-K$; the ratio between the number of PRB pairs for which $n_{EPDCCH,i}$ does not exceed a threshold, and the number of PRB pairs for which $n_{EPDCCH,i}$ is larger than or equal to the threshold, such that $$f(K, N_{RB}^S) = \frac{K}{N_{RB}^S - K};$$

the ratio between the number of PRB pairs for which $n_{EPDCCH,i}$ does not exceed the threshold, and the total number of physical resource block pairs within the set S, such that $$f(K, N_{RB}^S) = \frac{K}{N_{RB}^S};$$

and/or the ratio between the number of PRB pairs for which $n_{EPDCCH,i}$ is larger than or equal to the threshold $X_{Thresh}$, and the total number of PRB pairs within the set S, such that $$f(K, N_{RB}^S) = \frac{N_{RB}^S - K}{N_{RB}^S},$$

or a similar algorithm, according to some different embodiments.

The action of determining the set LS of aggregation levels may however according to some embodiments comprise: computing a parameter $n_{ECCE}$ reflecting the number of time-frequency resource elements available per aggregated basic unit block within the allocated set S of PRB pairs, and determining from said parameter $n_{ECCE}$ a set LS of aggregation levels that is supportable by all PRB pairs in the set S.

Furthermore, according to some alternative embodiments, the allocated set S of PRB pairs may comprise at least two distinct PRB pairs i, j∈ S with i≠j such that $n_{EPDCCH,i}$<threshold and $n_{EPDCCH,j}\geq$threshold, wherein the first PRB pair i is supporting a first set L1 of aggregation levels and the second PRB pair j is supporting a second set L2 of aggregation levels, wherein time-frequency resource elements are grouped into a number n=0, . . . , N−1 of aggregated basic unit blocks used to form possible positions of the downlink control channel within the set S of PRB pairs. Furthermore, the action of determining the set LS of aggregation levels may further comprise, according to some embodiments, selecting one of the first set L1 of aggregation levels and second set L2 of aggregation levels by: computing the number $n_{ECCE, n}$ of time-frequency resource elements in each aggregated basic unit block n=0, . . . , N−1 within the set S available for the transmission of the downlink control channel; computing a parameter $n_{ECCE}$ reflecting the number of time-frequency resource elements available per aggregated basic unit block within the set S as a function of all $n_{ECCE, n}$, such that: $n_{ECCE}=f(n_{ECCE,0}, \ldots, n_{ECCE,N-1})$; selecting the first set L1 when $n_{ECCE}$<threshold, otherwise selecting the second set L2 of aggregation levels, wherein the threshold is related to the number of PRB pairs available for the transmission of downlink control channel signals, according to different embodiments.

Further, the parameter $n_{ECCE}$ may be determined by any of: the minimum among all $n_{ECCE,n}$, such that $$n_{ECCE} = \min_{n=0,\ldots,N-1} n_{ECCE,n};$$

the maximum among all $n_{ECCE,n}$, such that $$n_{ECCE} = \min_{n=0,\ldots,N-1} n_{ECCE,n};$$

the average among all $n_{ECCE,n}$, i.e., $$n_{ECCE} = \frac{1}{N}\sum_{n=0}^{N-1} n_{ECCE,n};$$

the difference between the largest and the smallest $n_{ECCE,n}$, such that $$n_{ECCE} = \max_{n=0,\ldots,N-1} n_{ECCE,n} - \min_{n=0,\ldots,N-1} n_{ECCE,n},$$

according to some different embodiments.

Additionally, the action of determining the set of aggregation levels may comprise: computing the number of time-frequency resource elements $n_{EPDCCH}$ that assures M of equally sized groups of elements used for defining correspondence between enhanced control channels and time-frequency resource elements in each PRB pair of the allocated 301 set, and determining from said parameter $n_{EPDCCH}$ the supported aggregation levels, according to some embodiments.

According to some embodiments, a PRB pair set S may be allocated for the transmission of downlink control channel, wherein the action of determining the set LS of aggregation levels further may comprise: discover the PRB pair in S with the minimum amount of time-frequency resource elements available for the transmission of downlink control channel, such that $$\tilde{i} = \arg\min_{i=0,\ldots,N_{RB}^S-1} n_{EPDCCH,i},$$

where $N_{RB}{}^S$ is the number of PRB pairs within the set S; mapping the groups of elements used for defining correspondence between enhanced control channels and resource elements to $n_{EPDCCH}=n_{EPDCCH,\tilde{i}}$ resource elements in each PRB pairs within the set S; and/or mapping the groups of elements used for defining correspondence between enhanced control channels and time-frequency resource elements to $n_{EPDCCH}=n_{EPDCCH,\tilde{i}}-n_{EPDCCH,\tilde{i}} \bmod(M)$ time-frequency resource elements in each PRB pairs within the set S when $n_{EPDCCH,\tilde{i}}$ is not an integer multiple of M, according to some embodiments.

Further, in some embodiments, for each possible time-frequency position of the downlink control channel, corresponding to the lowest aggregation level in at least one set LS of aggregation levels, within the allocated set S of PRB pairs, the supported set LS of aggregation levels may be further determined from the payload size and the number of time-frequency resource elements used in said position.

Additionally, for a given Downlink Control Information (DCI) format, the method may comprise, according to some embodiments: verifying in each PRB pairs of the PRB pair set S allocated for downlink control channel transmission, the possible positions of downlink control channel for aggregation level 1 and discarding the positions that yield a code rate larger than a given threshold.

Action 304

The downlink control channel is transmitted within said set S of PRB pairs.

The transmission of downlink control channel may be either localized or distributed according to some embodiments. Further, the action of transmitting a downlink control channel within said set of PRB pairs may comprise: adjusting the transmission of a downlink control channel according to one of the aggregation levels supported in the allocated 301 set S of PRB pairs, according to some embodiments.

Figure 4:
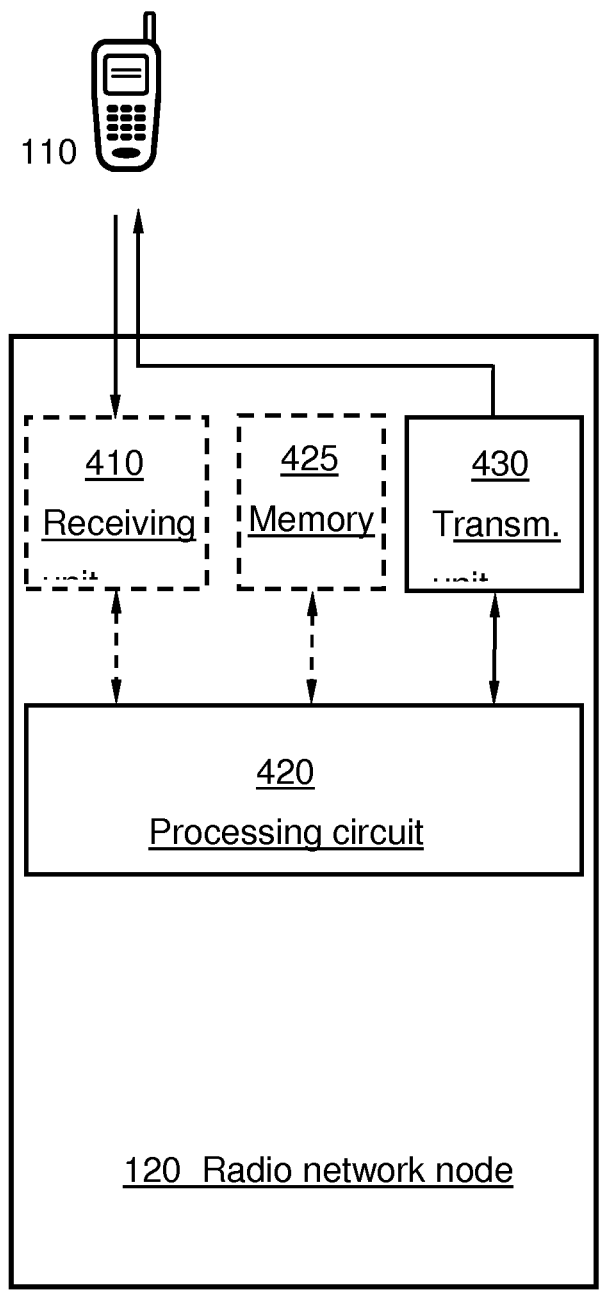
FIG. 4 is a block diagram illustrating a radio network node according to an embodiment of the invention.

FIG. 4 is a block diagram illustrating a radio network node 120 in a wireless communication system 100. The radio network node 120 is configured for transmitting downlink control channel signals in a downlink frequency carrier of a wireless communication system 100, wherein at least two PRB pairs configurable for the transmission of a downlink control channel have, in at least one subframe 200, different numbers of time-frequency resource elements available for the transmission of said downlink control channel.

The wireless communication system 100 may be based on an LTE system. The receiver 110 may be a User Equipment (UE). The radio network node 120 may be an evolved NodeB (eNodeB). The data channel may be a Physical Downlink Shared Channel (PDSCH). The control channel may be an Enhanced Physical Downlink Control Channel (EPDCCH). The aggregated basic unit block may be an Enhanced Control Channel Element (ECCE). The groups of elements used for defining correspondence between enhanced control channels and time-frequency resource elements may be Enhanced Resource Element Groups (EREGs).

The radio network node 120 is configured to perform the different embodiments of the above described method 300 according to any, some or all of the actions 301-304 for transmitting control information.

For enhanced clarity, any internal electronics or other components of the radio network node 120, not completely indispensable for understanding the herein described embodiments have been omitted from FIG. 4.

The radio network node 120 comprises a processing circuit 420, configured for allocating at least one set of PRB pairs, and additionally configured for determining the set LS of aggregation levels supported for the transmission of a downlink control channel within the allocated set S of PRB pairs, based on the number of time-frequency resource elements available for the transmission of a downlink control channel in PRB pairs of the set S.

The processing circuit 420 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 420 may further perform data processing functions for inputting, outputting, and processing of data comprising data buffering and device control functions, such as call processing control, user interface control, or the like.

Further, the radio network node 120 also comprises a transmitting unit 430, configured for transmitting the downlink control channel within said set S of PRB pairs.

In addition, according to some embodiments, the radio network node 120 may comprise a receiving unit 410, configured for receiving radio signals over a wireless interface. The radio signals may be received from, e.g., the receiver 110, or any other entity configured for wireless communication according to some embodiments.

Furthermore, the radio network node 120 may comprise at least one memory 425, according to some embodiments. The memory 425 may comprise a physical device utilised to store data or programs, i.e., sequences of instructions, on a temporary or permanent basis. According to some embodiments, the memory 425 may comprise integrated circuits comprising silicon-based transistors. Further, the memory 425 may be volatile or non-volatile.

The actions 301-304 to be performed in the radio network node 120 may be implemented through the one or more processing circuits 420 in the radio network node 120, together with computer program code for performing the functions of the actions 301-304. Thus a computer program product, comprising instructions for performing the actions 301-304 in the radio network node 120 may perform transmission of downlink control channel signals in a downlink frequency carrier of a wireless communication system 100, according to the method 300 in the radio network node 120 in a wireless communication system 100, when the computer program product is loaded in a processing circuit 420 of the radio network node 120.

The computer program product mentioned above may be provided for instance in the form of a data carrier carrying computer program code for performing at least some of the actions 301-304 according to some embodiments when being loaded into the processing circuit 420. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 120 remotely, e.g., over an Internet or an intranet connection.

Figure 5:
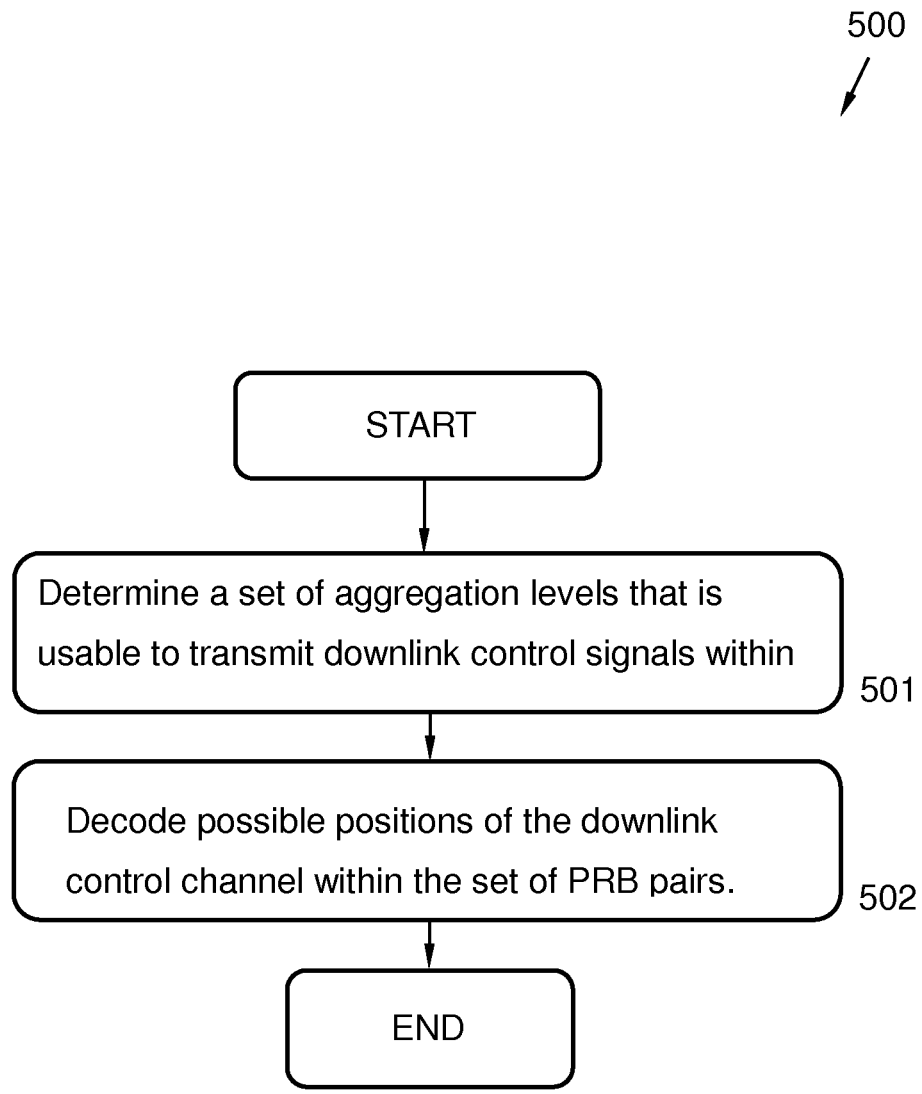
FIG. 5 is a flow chart illustrating a method in a receiver according to an embodiment of the invention.

FIG. 5 is a flow chart illustrating embodiments of a method 500 for use in a receiver 110 in a wireless communication system 100. The method 500 aims at receiving and decoding of downlink control channel signals over a set of PRB pairs, available for the transmission of the downlink control in at least one subframe 200. The set of PRB pairs may comprise at least two PRB pairs configurable for having a different number of resource elements, in at least one subframe, according to some embodiments.

The wireless communication system 100 may be based on an LTE system. The receiver 110 may be a User Equipment (UE). The radio network node 120 may be an evolved NodeB (eNodeB). The data channel may be a Physical Downlink Shared Channel (PDSCH). The control channel may be an Enhanced Physical Downlink Control Channel (EPDCCH). The aggregated basic unit block may be an Enhanced Control Channel Element (ECCE). The groups of elements used for defining correspondence between enhanced control channels and time-frequency resource elements may be Enhanced Resource Element Groups (EREGs).

To appropriately perform the reception of the information entity, the method 500 may comprise a number of actions 501-502.

It is however to be noted that any, some or all of the described actions 501-502, may be performed in a somewhat different chronological order than the enumeration indicates, or even be performed simultaneously. The method 500 may comprise the following actions:

Action 501

A set LS of aggregation levels that is usable to transmit downlink control signals within the set S of PRB pairs received from a radio network node 120 is determined.

Action 502

The possible positions of the downlink control channel within the set S are decoded.

Figure 6:
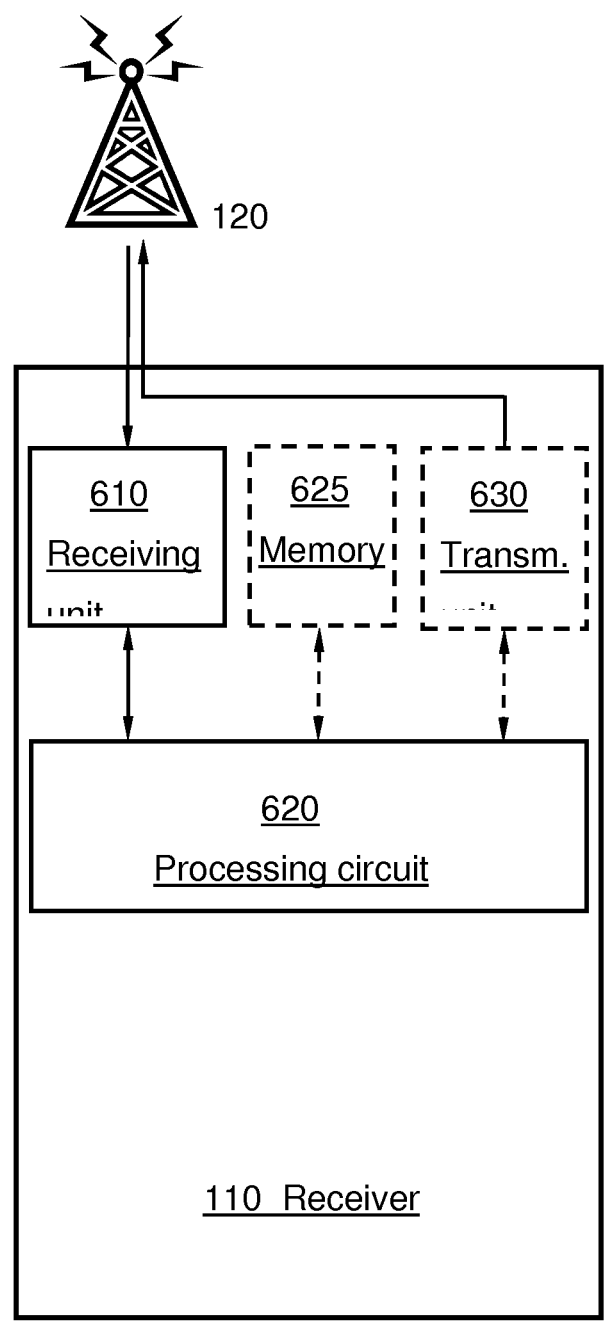
FIG. 6 is a block diagram illustrating a receiver according to an embodiment of the invention.

FIG. 6 is a block diagram illustrating a receiver 110 in a wireless communication system 100. The receiver 110 is configured for receiving and decoding of downlink control channel signals over a set of Physical Resource Block (PRB) pairs, available for the transmission of the downlink control in at least one subframe 200. The set of PRB pairs may comprise at least two PRB pairs in the set that are configurable for having a different number of time-frequency resource elements according to some embodiments.

The wireless communication system 100 may be based on an LTE system. The receiver 110 may be a User Equipment (UE). The radio network node 120 may be an evolved NodeB (eNodeB). The data channel may be a Physical Downlink Shared Channel (PDSCH). The control channel may be an Enhanced Physical Downlink Control Channel (EPDCCH). The aggregated basic unit block may be an Enhanced Control Channel Element (ECCE). The groups of elements used for defining correspondence between enhanced control channels and time-frequency resource elements may be Enhanced Resource Element Groups (EREGs).

The receiver 110 is configured to perform any, some or all of the actions 501-502 for receiving and decoding of downlink control channel signals over a set of PRB pairs.

For enhanced clarity, any internal electronics or other components of the receiver 110, not completely indispensable for understanding the herein described embodiments has been omitted from FIG. 6.

The receiver 110 comprises a receiving unit 610, configured for receiving downlink control channel signals over the set S of PRB pairs from a radio network node 120.

The receiver 110 further comprises a processing circuit 620, configured for determining a set LS of aggregation levels that is usable to transmit downlink control signals within a set S of PRB pairs, and also configured for decoding the possible positions of the downlink control channel within the set S.

The processing circuit 620 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 620 may further perform data processing functions for inputting, outputting, and processing of data comprising data buffering and device control functions, such as call processing control, user interface control, or the like.

Also, according to some embodiments, the receiver 110 may comprise a transmitting unit 630, configured for transmitting radio signals.

Furthermore, the receiver 110 may comprise at least one memory 625, according to some embodiments. The memory 625 may comprise a physical device utilised to store data or programs, i.e., sequences of instructions, on a temporary or permanent basis. According to some embodiments, the memory 625 may comprise integrated circuits comprising silicon-based transistors. Further, the memory 625 may be volatile or non-volatile.

The actions 501-502 to be performed in the receiver 110 may be implemented through one or more processing circuits 620 in the receiver 110, together with computer program code for performing the functions of the actions 501-502. Thus a computer program product, comprising instructions for performing the actions 501-502 in the receiver 110 may perform the method 500 for receiving and decoding of downlink control channel signals over a set S of PRB pairs, according to the actions 501-502, when the computer program product is loaded in a processing circuit 620 of the receiver 110.

The computer program product mentioned above may be provided for instance in the form of a data carrier carrying computer program code for performing at least some of the actions 501-502 according to some embodiments when being loaded into the processing circuit 620. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 110 remotely, e.g., over an Internet or an intranet connection.

The terminology used in the detailed description of the invention as illustrated in the accompanying drawings is not intended to be limiting of the described methods 300, 500, radio network node 120 and receiver 110, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

What is claimed is:

1. A method for transmission of downlink control channel signals in a downlink frequency carrier of a wireless communication system, wherein at least two Physical Resource Block (PRB) pairs configurable for the transmission of a downlink control channel have, in at least one subframe, different numbers of time-frequency resource elements available for the transmission of the downlink control channel, the method comprising:

allocating a set S of PRB pairs;
arranging time-frequency resource elements from the set S into an aggregation comprising at least one level;
determining a set LS of aggregation levels supported for the transmission of a downlink control channel within the allocated set of PRB pairs, wherein the allocated set S of PRB pairs comprises a first PRB pair and a second PRB pair, wherein the first PRB pair and the second PRB pair are each selected according to a relationship between a threshold and the respective number of time-frequency resource elements available for the transmission of a downlink control channel in the respective PRB pair, and wherein the set LS of aggregation levels is determined according to a first set of aggregation levels supported by the first PRB pair and a second set of aggregation levels supported by the second PRB pair; and
transmitting the downlink control channel within the set S of PRB pairs.

2. The method according to claim 1, wherein the allocation is performed by allocating at least one set S of PRB pairs having, in any subframe, in each PRB pair, the same number of time-frequency resource elements available for the transmission of a downlink control channel.

3. The method according to claim 1, wherein the allocation is performed by allocating at least one set S of PRB pairs comprising at least two PRB pairs having, in at least one subframe, different numbers of time-frequency resource elements available for the transmission of a downlink control channel.

4. The method according to claim 3, wherein the action of determining the set LS of aggregation levels comprises:
computing a parameter $n_{EPDCCH, i}$ that reflects the number of time-frequency resource elements available for the transmission of a downlink control channel in each PRB pair i of the allocated set S of PRB pairs, and determining from the parameter $n_{EPDCCH, i}$ a set LS of aggregation levels that is supportable in the allocated set S of PRB pairs.

5. The method according to claim 4, wherein the allocated set S of PRB pairs comprises a first and second distinct PRB pair i, j ∈ S, wherein i ≠ j, $n_{EPDCCH, i}$ is less than a threshold and $n_{EPDCCH, j}$ is greater than or equal to the threshold, wherein $n_{EPDCCH, j}$ reflects the number of time-frequency resource elements available for the transmission of a downlink control channel in the second distinct PRB pair j of the allocated set S of PRB pairs, wherein the first PRB pair i is supporting a first set L1 of aggregation levels and the second PRB pair j is supporting a second set L2 of aggregation levels, and wherein determining the set LS of aggregation levels further comprises:
determining the set LS of aggregation levels that is supportable in the allocated set S of PRB pairs by computing an intersection of the first set L1 of aggregation levels and the second set L2 of aggregation levels according to the relation LS =L1 ∩L2 .

6. The method according to claim 4, wherein the allocated set S of PRB pairs comprises a first and second distinct PRB pairs i, j ∈ S, wherein i ≠ j, $n_{EPDCCH, i}$ is less than a threshold and $n_{EPDCCH, j}$ is greater than or equal to the threshold, wherein $n_{EPDCCH, j}$ reflects the number of time-frequency resource elements available for the transmission of a downlink control channel in the second distinct PRB pair j of the allocated set S of PRB pairs, wherein the first PRB pair i is supporting a first set L1 of aggregation levels and the second PRB pair j is supporting a second set L2 of aggregation levels, and wherein determining the set LS of aggregation levels further comprises:
determining a smallest element l1 from the first set L1 and a smallest element l2 from the second set L2, and
determining the set LS of aggregation levels that is supportable in the allocated set S of PRB pairs by computing the following relation: LS =L$\tilde{i}$, where $$\tilde{i} = \arg\max_{i=1,2} li.$$

7. The method according to claim 3, wherein determining the set LS of aggregation levels comprises:
computing a parameter $n_{EPDCCH}$ reflecting the number of time-frequency resource elements available for the transmission of downlink control channel in any PRB pair within the allocated set S, and determining from the parameter $n_{EPDCCH}$ a set LS of aggregation levels that is supportable in the allocated set S of PRB pairs.

8. The method according to claim 7, wherein the allocated set S of PRB pairs comprises a first and second distinct PRB pair i, j ∈ S, wherein i ≠ j, $n_{EPDCCH, i}$ is less than a threshold and $n_{EPDCCH, j}$ is greater than or equal to the threshold, wherein $n_{EPDCCH, j}$ reflects the number of time-frequency resource elements available for the transmission of a downlink control channel in the second distinct PRB pair j of the allocated set S of PRB pairs, wherein the first PRB pair i is supporting a first set Li of aggregation levels and the second PRB pair j is supporting a second set L2 of aggregation levels, and wherein the action of determining the set LS of aggregation levels further comprises selecting one of the first set Li of aggregation levels and second set L2 of aggregation levels by:
computing the number $n_{EPDCCH, i}$ of time-frequency resource elements available for the transmission of downlink control channel in each PRB pair i of the set S;
computing a parameter $n_{EPDCCH}$ reflecting the time-frequency resource elements available in all PRB pairs within the set S as a function of all $n_{EPDCCH, i}$ according to the relation
$n_{EPDCCH}=f(n_{EPDCCH,0}, \ldots, n_{EPDCCH,N_{RB}^s-1})$, where $N_{RB}^s$ is the number of PRB pairs within the set S; and
selecting the first set L1 of aggregation levels when $n_{EPDCCH}$<the threshold, otherwise selecting the second set L2 of aggregation levels, where the threshold may be related to the number of time-frequency resource elements per PRB pair available for the transmission of downlink control channel.

9. The method according to claim 8, wherein the action of computing the parameter $n_{EPDCCH}$ is based on any of:
determining the minimum among all $n_{EPDCCH, i}$, such that $$n_{EPDCCH} = \min_{i=0, \ldots, N_{RB}^S-1} n_{EPDCCH,i};$$

determining the maximum among all $n_{EPDCCH, i}$, such that $$n_{EPDCCH} = \max_{i=0, \ldots, N_{RB}^S-1} n_{EPDCCH,i};$$

computing the average among all $n_{EPDCCH, i}$, such that $$n_{EPDCCH} = \frac{1}{N_{RB}^S} \sum_{i=0}^{N_{RB}^S-1} n_{EPDCCH,i},$$

where $N_{RB}^s$ is the number of PRB pairs within the set S; and computing the difference between the largest and the smallest $n_{EPDCCH, i}$, such that $$n_{EPDCCH} = \max_{i=0,\ldots,N_{RB}^S-1} n_{EPDCCH,i} - \min_{i=0,\ldots,N_{RB}^S-1} n_{EPDCCH,i},$$

10. The method according to claim 3, wherein determining the set LS of aggregation levels comprises:
computing a number of PRB pairs in the allocated set S of PRB pairs for which the number $n_{EPDCCH, i}$ of time-frequency resource elements available for the transmission of downlink control channel is less than a threshold value, and determining from said number of PRB pairs, a set LS of aggregation levels that is supportable in the allocated set S of PRB pairs.

11. The method according to claim 10, wherein the allocated set S of PRB pairs comprises a first and second distinct PRB pair i, j ∈ S , where i ≠ j , $n_{EPDCCH, i}$<the threshold, $n_{EPDCCH, j}$ is greater than or equal to the threshold, wherein $n_{EPDCCH, j}$ reflects the number of time-frequency resource elements available for the transmission of a downlink control channel in the second distinct PRB pair j of the allocated set S of PRB pairs, wherein the first PRB pair i is supporting a first set L1 of aggregation levels and the second PRB pair j is supporting a second set L2 of aggregation levels, and wherein determining the set LS of aggregation levels further comprises selecting one of the first set Li of aggregation levels and second set L2 of aggregation levels by:
computing the number $n_{EPDCCH, i}$ of time-frequency resource elements available in each PRB pair i ∈ S for the transmission of downlink control channel;
counting the number K of PRB pairs for which $n_{EPDCCH, i}$ does not exceed the threshold;
selecting the first set L1 when $f(K, N_{RB}^s)$<the threshold, otherwise selecting the second set L2 of aggregation levels, wherein the threshold may be related to the number of PRB pairs available for the transmission of downlink control channel, and $f(K, N_{RB}^s)$ is a function of K and $N_{RB}^s$, wherein the function $f(K, N_{RB}^s)$ is selected from one of:
the number of PRB pairs for which $n_{EPDCCH, i}$ does not exceed the threshold, such that $f(K, N_{RB}^s)$=K ;
the number of PRB pairs for which $n_{EPDCCH, i}$ is larger than or equal to the threshold, such that $f(K,N_{RB}^s)= N_{RB}^s-K$ ;
the ratio between the number of PRB pairs for which $n_{EPDCCH, i}$ does not exceed the threshold, and the number of PRB pairs for which $n_{EPDCCH,i}$ is larger than or equal to the threshold, such that $$f(K, N_{RB}^S) = \frac{K}{N_{RB}^S - K};$$

the ratio between the number of PRB pairs for which $n_{EPDCCH, i}$ does not exceed the threshold, and the total number of PRB pairs within the set S , such that $$f(K, N_{RB}^S) = \frac{K}{N_{RB}^S};$$

or the ratio between the number of PRB pairs for which $n_{EPDCCH, i}$ is larger than or equal to the threshold, and the total number of PRB pairs within the set S, such that $$f(K, N_{RB}^S) = \frac{N_{RB}^S - K}{N_{RB}^S}.$$

12. The method according to claim 3, wherein determining the set LS of aggregation levels comprises:
computing a parameter $n_{ECCE}$ reflecting the number of time-frequency resource elements available per aggregated basic unit block within the allocated set S of PRB pairs, and determining from said parameter $n_{ECCE}$ a set LS of aggregation levels that is supportable in the allocated set S of PRB pairs.

13. The method according to claim 12, wherein the allocated set S of PRB pairs comprises a first and second distinct PRB pair i, j ∈ S , wherein i ≠ j , $n_{EPDCCH, i}$<the threshold and $n_{EPDCCH, j}$ is greater than or equal to the threshold, wherein $n_{EPDCCH, j}$ reflects the number of time-frequency resource elements available for the transmission of a downlink control channel in the second distinct PRB pair j of the allocated set S of PRB pairs, wherein the first PRB pair i is supporting a first set L1 of aggregation levels and the second PRB pair j is supporting a second set L2 of aggregation levels, wherein time-frequency resource elements are grouped into a number n=0, . . . ,N−1 of aggregated basic unit blocks used to form possible positions of the downlink control channel within the set S of PRB pairs, and wherein determining the set LS of aggregation levels further comprises selecting one of the first set L1 of aggregation levels and second set L2 of aggregation levels by the following steps:
computing the number $n_{EccE,n}$, of time-frequency resource elements in each aggregated basic unit block n=0, . . . ,N−1 within the set S available for the transmission of the downlink control channel;
computing a parameter $n_{ECCE}$ reflecting the number of time-frequency resource elements available per aggregated basic unit block within the set S as a function of all $n_{EccE,n}$, such that:
$n_{ECCE}=f(n_{ECCE,0}, \ldots ,n_{ECCE,N-1})$; and
selecting the first set L1 when $n_{EccE}$<the threshold, otherwise selecting the second set L2 of aggregation levels, wherein the threshold may be related to the number of time-frequency resource elements per PRB pair available for the transmission of downlink control channel.

14. The method according to claim 13, wherein the parameter $n_{EccE}$ is determined by any of:
the minimum among all $n_{EccE,n}$ , such that $$n_{ECCE} = \min_{n=0,\ldots,N-1} n_{ECCE,n};$$

the maximum among all n $_{EccE,n}$, such that $$n_{ECCE} = \max_{n=0,\ldots,N-1} n_{ECCE,n};$$

the average among all $n_{ECCE,n}$, i.e., $$n_{ECCE} = \frac{1}{N}\sum_{n=0}^{N-1} n_{ECCE,n};$$

and
the difference between the largest and the smallest $n_{ECCE,n}$, such that $$n_{ECCE} = \max_{n=0,\ldots,N-1} n_{ECCE,n} - \min_{n=0,\ldots,N-1} n_{ECCE,n}.$$

15. The method according to claim 12, wherein the number $n_{EccE}$ is computed only for aggregated basic unit blocks that are part of a search space for a receiver.

16. The method according to claim 3, wherein determining the set of aggregation levels comprises:
computing the number of time-frequency resource elements $n_{EPDCCH}$ that assures M number of equally sized groups of elements for defining correspondence between enhanced control channels and time-frequency resource elements in each PRB pair of the allocated set, and determining from parameter $n_{EPDCCH}$ the supported aggregation levels in the allocated set S of PRB pairs.

17. The method according to claim 16, wherein for a PRB pair set S allocated for the transmission of downlink control channel, determining the set LS of aggregation levels further comprises:
discovering the PRB pair in S with the minimum amount of time-frequency resource elements available for the transmission of downlink control channel, such that $$\tilde{i} = \arg\min_{i \in S} n_{EPDCCH,i};$$

mapping the groups of elements used for defining correspondence between enhanced control channels and time-frequency resource elements to $n_{EPDCCH}=n_{EPDCCH,\tilde{i}}$ time-frequency resource elements in each PRB pair within the set S ; and/or
mapping the groups of elements used for defining correspondence between enhanced control channels and time-frequency resource elements to $n_{EPDCCH}=n_{EPDCCH,\tilde{i}} - n_{EPDCCH,\tilde{i}} \mod(M)$ time-frequency resource elements in each PRB pair within the set S , wherein $n_{EPDCCH,\tilde{i}}$ is not an integer multiple of M.

18. The method according to claim 1, wherein the transmission of downlink control channel is either localized or distributed, and wherein transmitting a downlink control channel within the set of PRB pairs comprises:
adjusting the transmission of a downlink control channel according to one of the aggregation levels supported in the allocated set S of PRB pairs.

19. The method according to claim 1, wherein for each possible time-frequency position of the downlink control channel, corresponding to the lowest aggregation level in at least one set LS of aggregation levels, within the allocated set S of PRB pairs, the supported set LS of aggregation levels is determined from a payload size and a number of time-frequency resource elements used in the time-frequency position.

20. The method according to claim 19, for a given Downlink Control Information (DCI) format, further comprising:
verifying in each PRB pair of the PRB pair set S allocated for downlink control channel transmission, the possible position of downlink control channel for aggregation level 1 and discarding positions that yield a code rate larger than a threshold.

21. The method according to claim 1, wherein the wireless communication system is an LTE system, wherein the receiver is a User Equipment (UE); the radio network node is an evolved NodeB, (eNodeBo; the control channel is an Enhanced Physical Downlink Control Channel (EPDCCH), and wherein the aggregated basic unit block is an Enhanced Control Channel Element (ECCE); the groups of elements used for defining correspondence between enhanced control channels and time-frequency resource elements are Enhanced Resource Element Groups (EREGs).

22. A radio network node for transmission of downlink control channel signals in a downlink frequency carrier of a wireless communication system, wherein at least two Physical Resource Block "PRB" pairs are configured for transmission of a downlink control channel and have, in at least one subframe, different numbers of time-frequency resource elements available for the transmission of the downlink control channel, wherein the radio network node comprises:
a processor, configured for allocating at least one set of PRB pairs, and additionally configured for determining the set LS of aggregation levels supported for the transmission of a downlink control channel within the allocated set S of PRB pairs, wherein the allocated set S of PRB pairs comprises a first PRB pair and a second PRB pair, wherein the first PRB pair and the second PRB pair are each selected according to a relationship between a threshold and the respective number of time-frequency resource elements available for the transmission of a downlink control channel in the respective PRB pair, and wherein the set LS of aggregation levels is determined according to a first set of aggregation levels supported by the first PRB pair and a second set of aggregation levels supported by the second PRB pair; and
a transmitter, configured for transmitting the downlink control channel within the set S of PRB pairs.

23. A method, performed by a receiving device, for receiving and decoding downlink control channel signals over a set S of Physical Resource Block (PRB) pairs, which are configured for transmission of a downlink control channel in at least one subframe, the method comprising:
determining a set LS of aggregation levels that is usable to transmit downlink control channel signals within the set S of PRB pairs received from a radio network node, wherein the set S of PRB pairs comprises a first PRB pair and a second PRB pair, wherein the first PRB pair and the second PRB pair are each selected according to a relationship between a threshold and the respective number of time-frequency resource elements available for the transmission of the downlink control channel in the respective PRB pair, and wherein the set LS of aggregation levels is determined according to a first set of aggregation levels supported by the first PRB pair and a second set of aggregation levels supported by the second PRB pair; and decoding the possible positions of the downlink control channel within the set S.

24. A receiving device, comprising:

a receiver circuit, configured for receiving from a radio network node downlink control channel signals over a set S of Physical Resource Block (PRB) pairs, wherein at least two PRB pairs are configured for transmission of a downlink control channel have, in at least one subframe, different numbers of time-frequency resource elements available for the transmission of the downlink control channel; and a processor, configured for determining a set LS of aggregation levels that is usable to transmit downlink control signals within the set S of PRB pairs, and also configured for decoding the possible positions downlink control channel within the set S, wherein the set S of PRB pairs comprises a first PRB pair and a second PRB pair, wherein the first PRB pair and the second PRB pair are each selected according to a relationship between a threshold and the respective number of time-frequency resource elements available for the transmission of the downlink control channel in the respective PRB pair, and wherein the set LS of aggregation levels is determined according to a first set of aggregation levels supported by the first PRB pair and a second set of aggregation levels supported by the second PRB pair.

* * * * *